United States Patent [19]

Hamano et al.

[11] Patent Number: 5,604,928
[45] Date of Patent: Feb. 18, 1997

[54] PORTABLE ELECTRONIC DEVICE WITH RADIO COMMUNICATION AND CONTROLLED COMPUTER STATUS

[75] Inventors: Soji Hamano; Takayuki Tanabe, both of Yokohama, Japan

[73] Assignee: Canon Kabushiki Kaisha, Tokyo, Japan

[21] Appl. No.: 460,716

[22] Filed: Jun. 2, 1995

Related U.S. Application Data

[63] Continuation of Ser. No. 10,567, Jan. 28, 1993, abandoned.

[30] Foreign Application Priority Data

Jan. 31, 1992 [JP] Japan ................................. 4-040673
Jan. 20, 1993 [JP] Japan ................................. 5-007761

[51] Int. Cl.$^6$ ........................................................ H04B 1/10
[52] U.S. Cl. .......................... 455/310; 455/63; 455/231; 455/343
[58] Field of Search .................................. 455/343, 38.3, 455/296, 298, 310, 311, 312, 34.1, 297, 63, 34.2, 226.1, 226.2, 317, 231, 67.1, 67.3

[56] References Cited

U.S. PATENT DOCUMENTS

| | | | |
|---|---|---|---|
| 4,921,464 | 5/1990 | Ito et al. | 455/34.1 |
| 4,977,611 | 12/1990 | Maru | 455/343 |
| 5,008,955 | 4/1991 | Sato | 455/310 |
| 5,027,428 | 6/1991 | Ishiguro et al. | 455/343 |
| 5,101,510 | 3/1992 | Duckeck | 455/343 |
| 5,193,212 | 3/1993 | Son | 455/343 |
| 5,204,975 | 4/1993 | Shigemori | 455/231 |
| 5,251,325 | 10/1993 | Davis et al. | 455/343 |

FOREIGN PATENT DOCUMENTS

| | | |
|---|---|---|
| 0315260A2 | 5/1989 | European Pat. Off. . |
| 0343528A2 | 11/1989 | European Pat. Off. . |
| 0351230A2 | 1/1990 | European Pat. Off. . |
| 0447302A1 | 9/1991 | European Pat. Off. . |
| 0463621A1 | 1/1992 | European Pat. Off. . |
| 2187065 | 8/1987 | United Kingdom . |

OTHER PUBLICATIONS

"Design Considerations for Mobile Radio Units in High-Capacity Land Mobile Communications Systems" by Shuomi Yuki et al.; Review of the Electrical Comm. Laboratories; vol. 35, No. 2, 1987; pp. 109–114.

*Primary Examiner*—Reinhard J. Eisenzopf
*Assistant Examiner*—Vo Nguyen
*Attorney, Agent, or Firm*—Fitzpatrick, Cella, Harper & Scinto

[57] ABSTRACT

A radio transmit-receive unit can perform the communication processing stably without being affected by high frequency noise with the system activation of a computer unit, whereby if a communication processing request from the radio transmit-receive unit occurs, the computer unit sets the system state of a sub-CPU being activated to a rest state, a counter starts clocking the signal receive time of the radio transmit-receive unit when the system state of the sub-CPU is in a rest state, and a latch circuit holds electric field strength information of carrier received by the radio transmit-receive unit upon the termination of clocking by the counter. And the computer unit switches the system state of the sub-CPU being at rest to an active state, based on the end state of clocking by the counter, to restart the activation of the computer unit.

13 Claims, 22 Drawing Sheets

PORTABLE ELECTRONIC DEVICE WITH RADIO COMMUNICATION AND CONTROLLED COMPUTER STATUS

This application is a continuation of application Ser. No. 08/010,567 filed Jan. 28, 1993, now abandoned.

BACKGROUND OF THE INVENTION

1. Field of the Invention

The present invention relates to a portable electronic device having a computer unit for performing data processing of desired information with radio communication.

2. Related Background Art

Conventionally, this type of electronic device has a radio transmit-receive unit for performing the radio communication and a computer unit for performing the data processing, wherein such a protective measure is often taken that the radio transmit-receive unit is encased for protection in a box with a metallic plate or the like to be in a shield state, providing a greater interval between computer unit and antenna, or the computer unit is encased in a box with a metallic plate or the like for shielding, so that the influence of high frequency noise from the computer unit may be eliminated while the radio transmit-receive unit is processing the communication.

However, in a portable electronic device requiring the miniaturization, as it is an antinomy proposition that the device is miniaturized while the computer unit is completely shielded, the computer unit may be arranged as great distance as possible away from the antenna, in which there was a problem that the influence of high frequency noise from the computer unit was not completely removed.

SUMMARY OF THE INVENTION

The present invention has been made to resolve the above-mentioned problem, and aims to provide a small and inexpensive portable electronic device in which a radio transmit-receive unit can stably perform communication processing, without being affected by high frequency noise produced with the system activation of a computer unit, in such a way that the radio transmit-receive unit performs receive processing of electric field strength for a carrier based on the communication processing state of the radio transmit-receive unit, while the system state of the computer unit is at rest.

A portable electronic device according to the present invention comprises control means for controlling setting the system state of computer unit based on the communication processing state of radio transmit-receive unit, timer means for clocking the signal receive time of radio transmit-receive unit by starting when the system state of computer unit set by the control means is at rest, and holding means for holding electric field strength information of a carrier which the radio transmit-receive unit has received upon the termination of clocking by the timer means, wherein the control means switches the system state of computer unit being at rest to an active state based on the end state of clocking by the timer means.

Also, the control means is configured to set the system state unto a rest state by shutting down the power supply to the computer unit.

Further, the control means is configured to set the system state into a rest state by resetting the computer unit.

In the present invention, if a communication processing request from the radio transmit-receive unit occurs, control means sets the system state of the computer unit being activated to a rest state, clocking means starts clocking the signal receive time of radio transmit-receive unit when the system state of computer unit is in the rest state, and holding means holds electric field strength information of a carrier received by the radio transmit-receive unit upon the termination of clocking by the timer means. And the control means switches the system state of computer unit being at rest to an active state based on the end state of clocking by the timer means in order to restart the activation of the computer unit, whereby the radio transmit-receive unit can perform the communication processing stably, without being affected by high frequency noise arising with the system activation of computer unit.

Also, the control means is configured to set the system state to a rest state by shutting down the power supply to the computer unit, whereby the radio transmit-receive unit can perform the communication processing stably, without being affected by high frequency noise arising with the system activation of computer unit, by stopping the occurrence of high frequency noise of computer unit temporarily.

Further, the control means is configured to set the system state to a rest state by resetting the computer unit, whereby the radio transmit-receive unit can perform the communication processing stably, while influence of high frequency noise arising with the system activation of computer unit is relieved by suppressing the occurrence of high frequency noise of computer unit temporarily.

A portable electronic device according to the present invention is provided with control means for controlling setting the system state of computer unit based on the communication state of radio transmit-receive unit, timer means operating on a low frequency clock for clocking the signal receive time of radio transmit-receive unit by starting before the system state of computer unit set by the control means leads to a rest state, and holding means for holding electric field strength information of carrier which the radio transmit-receive unit has received upon the termination of clocking by the timer means, whereby the control means switches the system state of computer unit being at rest to an active state, based on the end state of clocking by the timer means.

Also, the control means is configured to set the system state to a rest state by shutting down the power supply to the computer unit.

Further, the control means is configured to-set the system state to a rest state by resetting the computer unit.

Further, the control means is configured to set the system state to a rest state in such a way that the computer unit sets itself to a halt state.

In the present invention, if a communication processing request from the radio transmit-receive unit or computer unit occurs, the control means sets the system state of computer unit being activated to a rest state, the clocking means operating on a low frequency clock starts clocking the signal receive time of radio transmit-receive unit when the system state of computer unit is in a rest state, and the holding means holds electric field strength information of a carrier which the radio transmit-receive unit has received upon the termination of clocking by the timer means. And the control means switches the system state of computer unit being at rest to an active state, based on the end state of clocking by the timer means, to restart the activation of the computer unit, thereby enabling radio communication means to perform the communication processing, whereby the radio transmit-receive unit can search for an available channel and perform the communication processing by using that channel in a stable manner, without being affected by high frequency noise arising with the operation of computer unit.

Also, the control means is configured to set the system state to a rest state by shutting down the power supply to the computer unit, whereby the radio transmit-receive unit can search for an available channel and perform the communication processing in a stable manner, without being affected by high frequency noise arising with the operation of computer unit, by stopping the occurrence of high frequency noise of computer unit temporarily.

Further, the control means is configured to set the system state to a rest state by resetting the computer unit, whereby the radio transmit-receive unit can search for an available channel and perform the communication processing in a stable manner, while influence of high frequency noise arising with the operation of computer unit is relieved by suppressing the occurrence of high frequency noise of computer unit temporarily.

Further, the control means is configured to set the system state to a rest state in such a way that the computer unit sets itself to a halt state, whereby the radio transmit-receive unit can search for an available channel and perform the communication processing by using that channel in a stable manner, while relieving the occurrence of high frequency noise of computer unit temporarily.

DETAILED DESCRIPTION OF THE PREFERRED EMBODIMENTS

Figure 1:
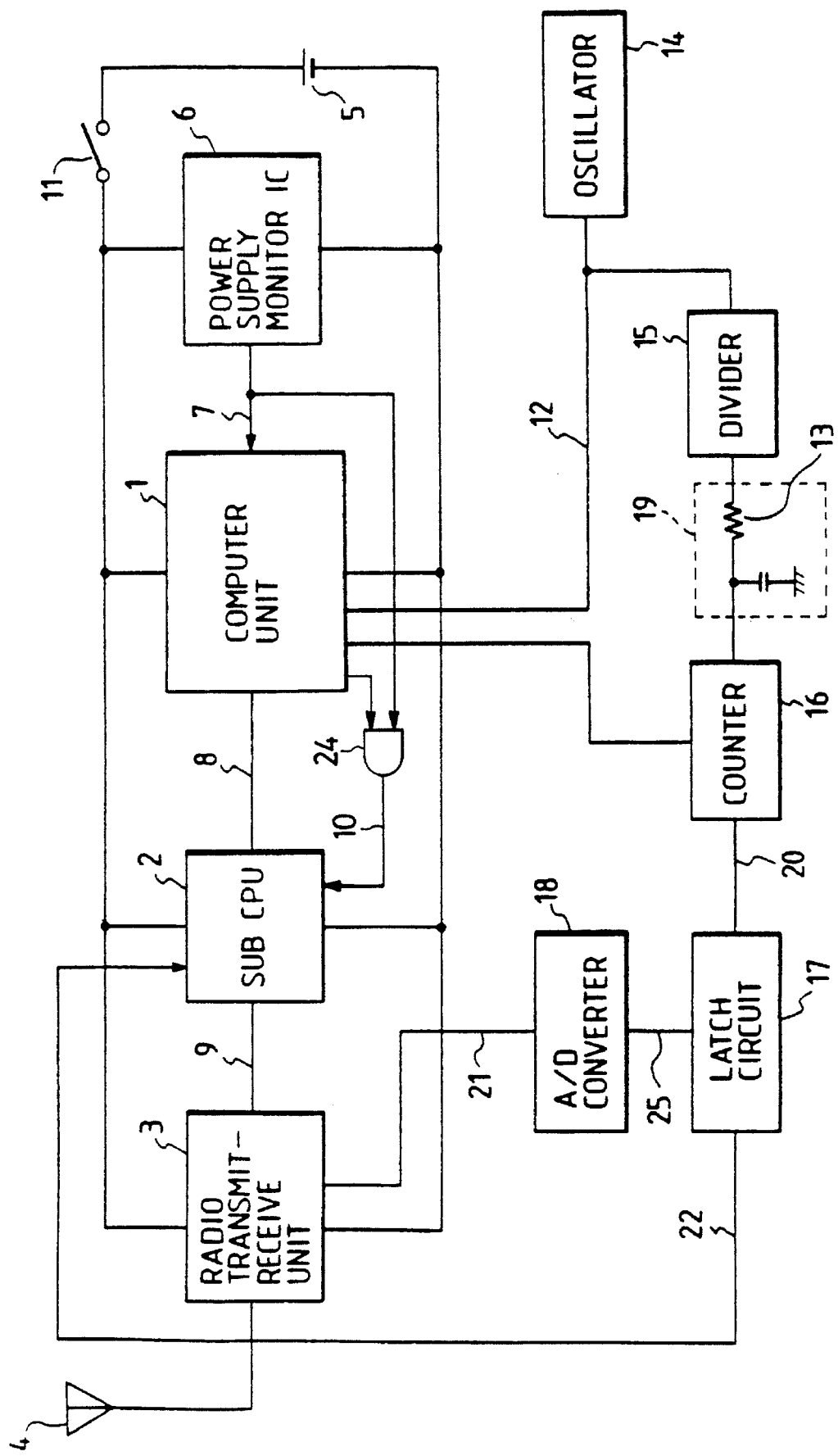
FIG. 1 is a block diagram for explaining a configuration of a portable electronic device according to one embodiment of the present invention.

FIG. 1 is a block diagram for explaining a configuration of a portable electronic device according to one embodiment of the present invention.

In the figure, 1 is a computer unit, comprising a keyboard for the input of information or instructions, a display unit for displaying input information or processed result, a memory for storing data and processing procedures as shown in flowcharts as thereafter described, processing means for processing data in accordance with processing procedure stored in the memory, and communication interface for communicating the information processed by processing procedure to the outside. The computer unit 1 is connected to a sub-CPU 2 via a control line 8, the sub-CPU 2 comprising a memory for storing data and programs for executing processing procedures as shown in flowcharts as thereafter described, processing means for processing data in accordance with the program stored in the memory, and a communication interface for communicating the information processed by processing means to the outside. The sub-CPU 2 communicates with the computer unit 1 for the transmission of information. The computer unit 1 is initiated upon a clock supplied from an oscillation circuit 14 via a clock line 12 with a reset signal 7 released. The clock supplied via the clock line 12 from the oscillation circuit 14 is divided in frequency by a divider circuit 15, and an output 13 after dividing to a frequency corresponding to 2 msec is output via a low-pass filter 19 to a counter 16.

3 is a radio transmit-receive unit for communicating with an external equipment, not shown, via an antenna 4. A received electric field strength detected by the radio transmit-receive unit 3 is A/D converted by an A/D converter 18, and then latched in a latch circuit 17 via an A/D converter output line 25. The latch circuit 17 may be either of a first-in first-out system of memory and an addressing system, when storing the received electric field strength for a plurality of channels. 5 is a battery for supplying power supply voltage in accordance with the on/off state of a power supply switch 11.

6 is a power supply monitor IC for monitoring the power supply voltage state from the battery 5 to send out a reset signal via a computer reset line 7 to the computer unit 1 and an AND gate 24. The AND gate 24 sends out the reset signal via a sub-CPU reset line 10 to the sub-CPU 2, based on the reset signal and the output state from the computer unit 1. 20 is a ripple carry-out of the counter 16, 21 is a signal strength detection line, and 22 is a latch data output line for outputting electric field strength data latched in the latch circuit 17 to the sub-CPU 2. 23 is a reset line for transferring a counter control signal from the computer unit 1 to the counter 16. 9 is a control line.

In the portable electronic device thus constituted, if a communication processing request from the radio transmit-receive unit 3 occurs, control means sets the system state of the computer unit sub-CPU 2 being activated to a rest state, clocking means (counter 16) starts clocking the signal receive time of the radio transmit-receive unit 3 when the system state of computer unit (sub-CPU 2) is in a rest state, and holding means (latch circuit 17) holds electric field strength information of carrier which the radio transmit-receive unit 3 has received upon the termination of clocking by the timer means (counter 16). And the control means (computer unit 1) switches the system state of computer unit (sub-CPU 2) being at rest to an active state, based on the end state of clocking by the timer means (counter 16), to restart the activation of computer unit (sub-CPU 2), whereby the radio transmit-receive unit 3 can perform the communication processing stably, without being affected by high frequency noise arising with the system activation of the computer unit (sub-CPU 2 in this embodiment).

Also, the control means is configured to set the system state to a rest state by shutting down the power supply to the computer unit sub-CPU 2, whereby the radio transmit-receive unit 3 can perform the communication processing stably, without being affected by high frequency noise arising with the system activation of the computer unit sub-CPU 2, by stopping the occurrence of high frequency noise of the computer unit sub-CPU 2 temporarily.

Further, the control means is configured to set the system state to a rest state by resetting the computer unit sub-CPU 2, whereby the radio transmit-receive unit 3 can perform the communication processing stably, while the influence of high frequency noise arising with the system activation of the computer unit sub-CPU 2 is relieved by suppressing the occurrence of high frequency noise of the computer unit sub-CPU 2 temporarily.

Figure 2:
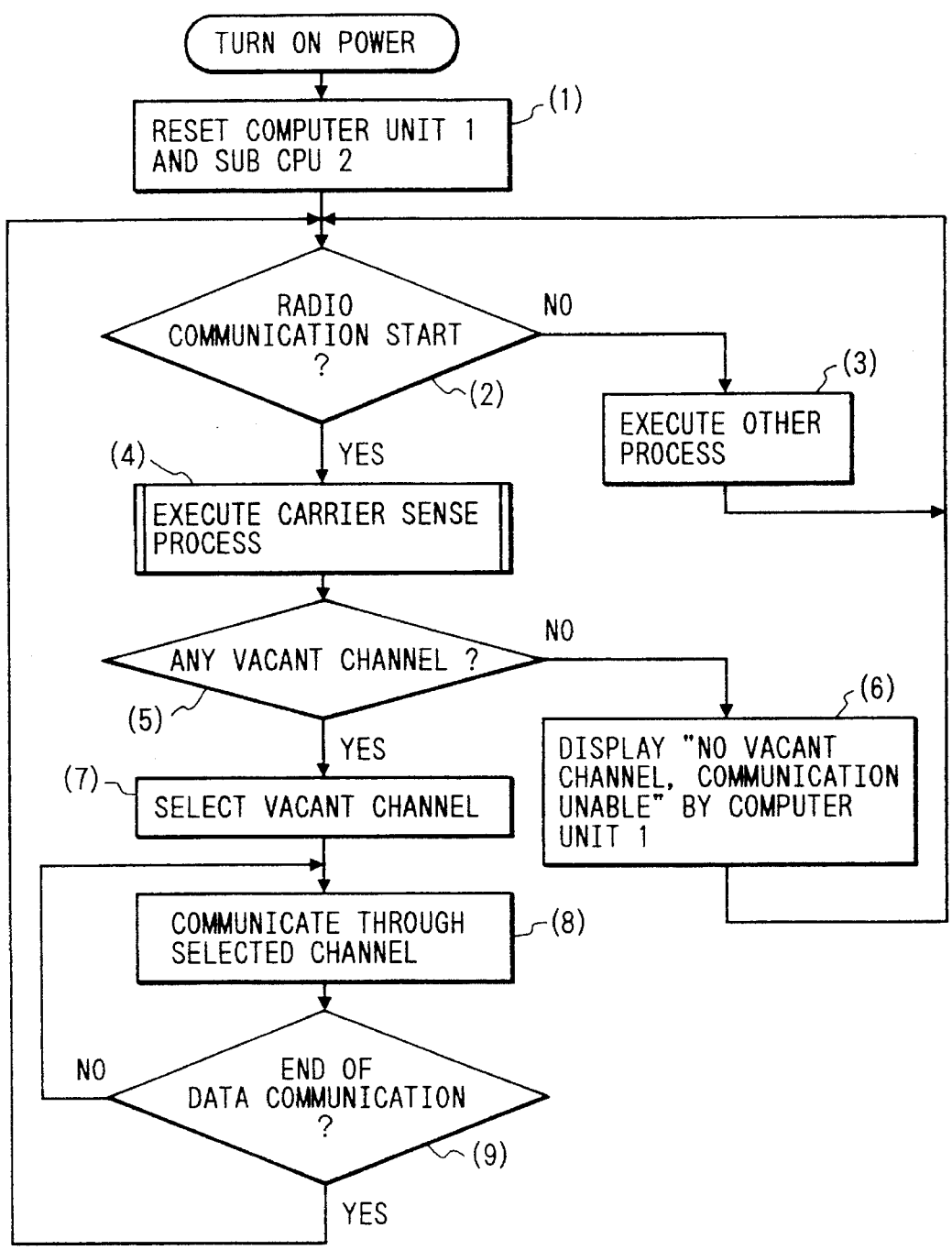
FIG. 2 is a flowchart showing one example of a first radio communication processing procedure in the portable electronic device according to the present invention.

FIG. 2 is a flowchart showing one example of a first radio transmit-receive processing procedure in a portable electronic device according to the present invention. Note that (1) to (9) indicate each step.

First, if power switch 11 is turned on, computer unit 1 is reset upon a reset signal sent out via the computer unit reset line 7, and sub-CPU 2 is reset upon a reset signal sent out via the sub-CPU reset line 10 (1). Then, the computer unit 1 is checked to determine whether to start the radio communication (2), in which if the answer is NO, the computer unit 1 executes other process (3) and the procedure returns to step (2).

On the other hand, if the determination at step (2) is YES, the radio transmit-receive unit 3 receives all the channels one by one to execute carrier sense process (the detail procedure will be described later) for retrieving the channel having a predetermined electric field strength or less. Then, the presence or absence of any vacant channel is determined (5), in which if the answer is NO, the computer unit 1 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through the selected channel, that is, the computer unit 1 communicates data with the sub-CPU 2, which in turn communicates data with the radio transmit-receive unit 3, with data exchange (8), and the end of data communication is judged (9), in which the procedure returns to step (2) if the answer is YES, or otherwise to step (8).

Figure 3:
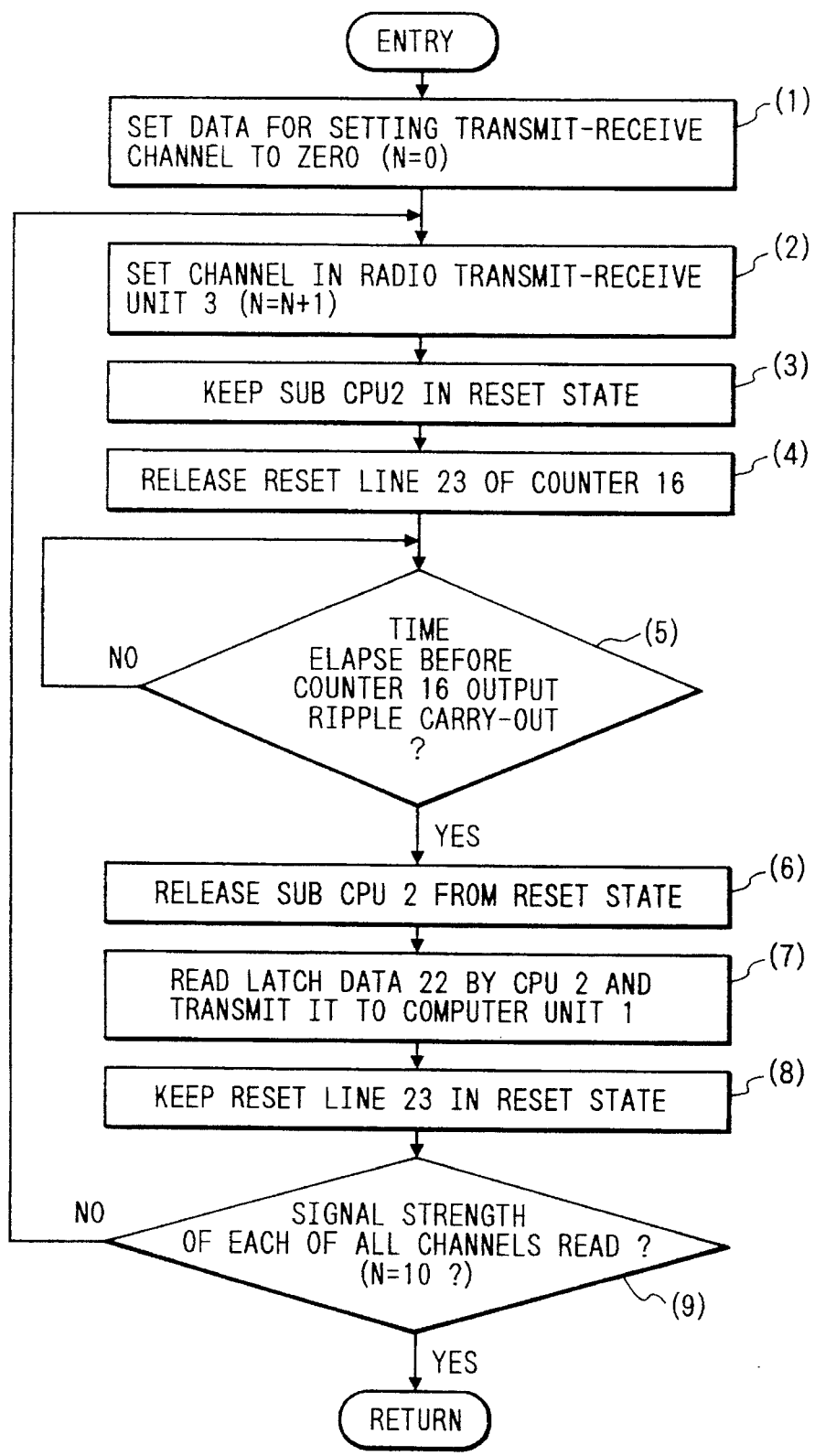
FIG. 3 is a flowchart showing in detail one example of a carrier sense processing procedure as shown in FIG. 2.

Referring now to flowchart as shown in FIG. 3, processing operation of carrier sense as shown in FIG. 2 will be described below.

FIG. 3 is a flowchart showing in detail one example of a carrier sense processing procedure as shown in FIG. 2. Note that (1) to (9) indicate each step.

First, data for setting transmit-receive channel is set to zero (1). At this step, the radio transmit-receive unit 3 has no channel setting. Then, the computer unit 1 sets channel (N=N+1) in the radio transmit-receive unit 3 via the sub-CPU 2 (2). Then, the sub-CPU 2 is kept in reset state (3), and reset line 23 of counter 16 is released (4). Then, waiting for a predetermined time to elapse until the counter 16 outputs a ripple carry-out 20 (5), and if the ripple carry-out 20 is output, the sub-CPU 2 is released from reset state (6). Then, ripple carry-out signal 20 is output by a processing to be carried out during waiting time of the step (5), that is, if the input of the counter 16 is counted (2 msec for one period) by, for example, fifteen times, and latch data latched in latch circuit 17 by a processing of latching the value of A/D converter 18 in latch circuit 17 is read by the sub-CPU 2 via the latch data output line 22, and transmitted via the control line 8 to the computer unit 1 (7).

Then, the reset line 23 is kept in reset state (8). And a determination is performed as to whether or not the signal strength of all the channels is read (N=10 (where channel number N is e.g., from 1 to 10) ) (9), in which if the answer is YES, the procedure returns to main procedure, or otherwise returns to step (2) to repeat the above processing.

In the above embodiment, the radio transmit-receive unit 3 is prevented from experiencing influence of noise arising in the processing of the sub-CPU 2 by resetting the sub-CPU 2 during the communication of the radio transmit-receive unit 3, but it will be appreciated that the radio transmit-receive unit 3 may be configured not to be affected by noise arising in the data processing as above described, by shutting down the power supply to the computer unit 1 during the communication of the radio transmit-receive unit 3, as will be described later.

Figure 4:
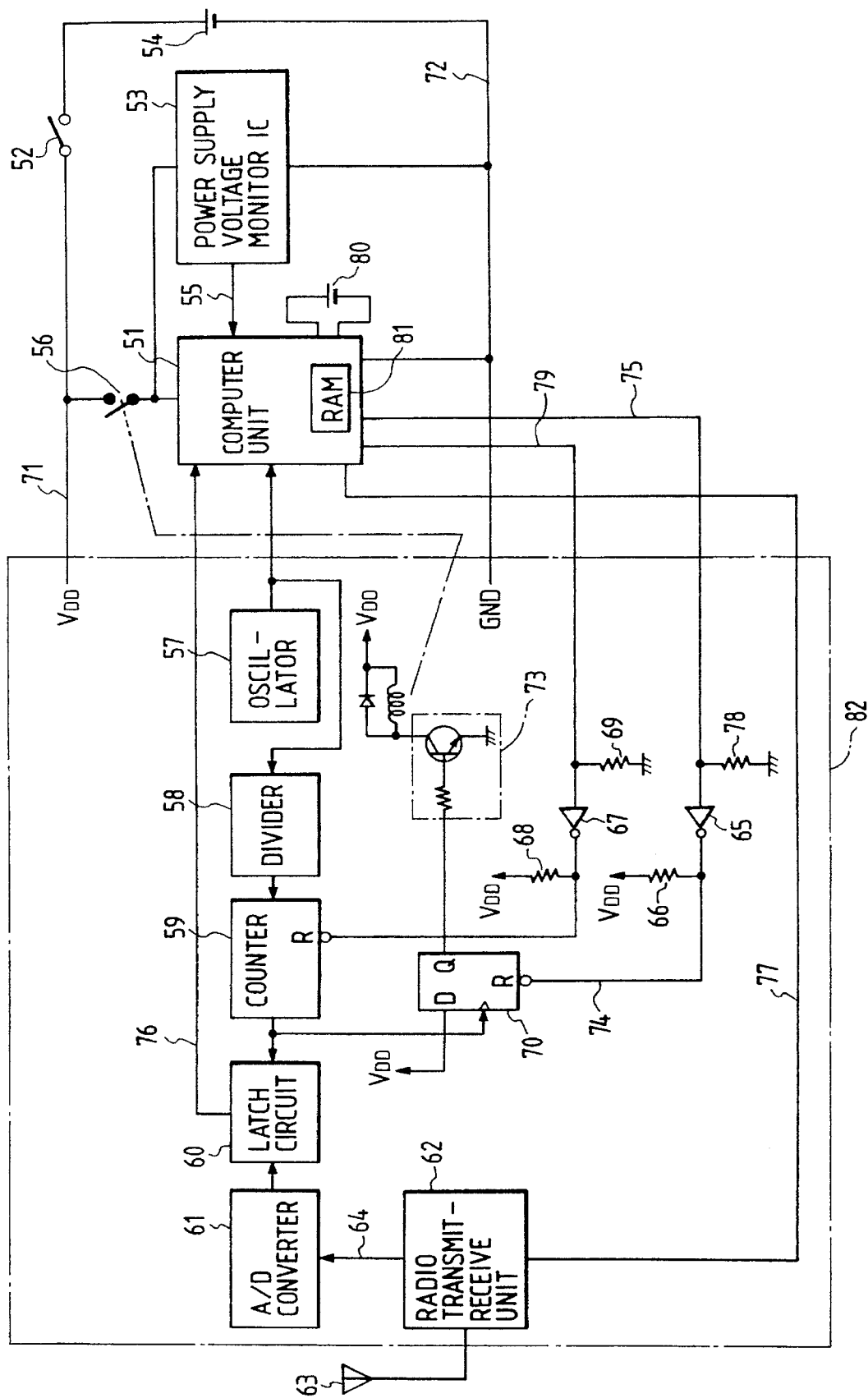
FIG. 4 is a block diagram for explaining a configuration of a portable electronic device according to another-embodiment of the present invention.

FIG. 4 is a block diagram for explaining a configuration of a portable electronic device according to another embodiment of the present invention.

In the figure, 51 is a computer unit containing RAM 81, the contents of RAM 81 held by a backup battery 80 (consisting of lithium battery). The computer unit 51 is initiated by the clock supplied via a clock line 76 from an oscillator 57.

54 is a battery for supplying a constant power supply voltage to the circuit in accordance with the on/off state of a power supply switch 52. 53 is a power supply voltage monitor IC for monitoring the voltage state to be applied to the computer unit 51 to send out a reset signal via a reset line 55 to the computer unit 51. 56 is a relay switch which is switched on/off by a relay drive circuit 73. 58 is a divider circuit for dividing in frequency the clock supplied via a clock line from the oscillator 57 to send out a divided clock having a predetermined frequency to a counter circuit 59. 60 is a latch circuit for latching received electric field strength, which is detected by the radio transmit-receive unit 62 and then transmitted via an A/D converter output line 64 after A/D conversion by an A/D converter 61. 63 is an antenna, 65 is an open collector inverter which sends out a reset signal to a flip-flop 70 depending on the state of a reset control signal input via a reset control signal line 75 to which a resistor 78 having its one end grounded is connected. 74 is a reset line for outputting the reset signal out-put from the open collector inverter 65 to the flip-flop 70. The reset line 74 is pulled up by a resistor 66.

67 is an open collector inverter which sends out the reset signal to the counter circuit 59 depending on the state of reset control signal input via a reset control signal line 79 to which a resistor 69 having its one end grounded is connected. 68 is a resistor for pulling up the voltage of counter input line. 82 is a substrate the packaged chip components of which are driven by a power supply VDD from a power supply line 71. 72 is a ground line with its one end connected to a ground line GND of the substrate 82. 76 is a latch data line for transferring received electric field strength latched in the latch circuit 60 into the computer unit 51. 77 is a communication line.

Figure 5:
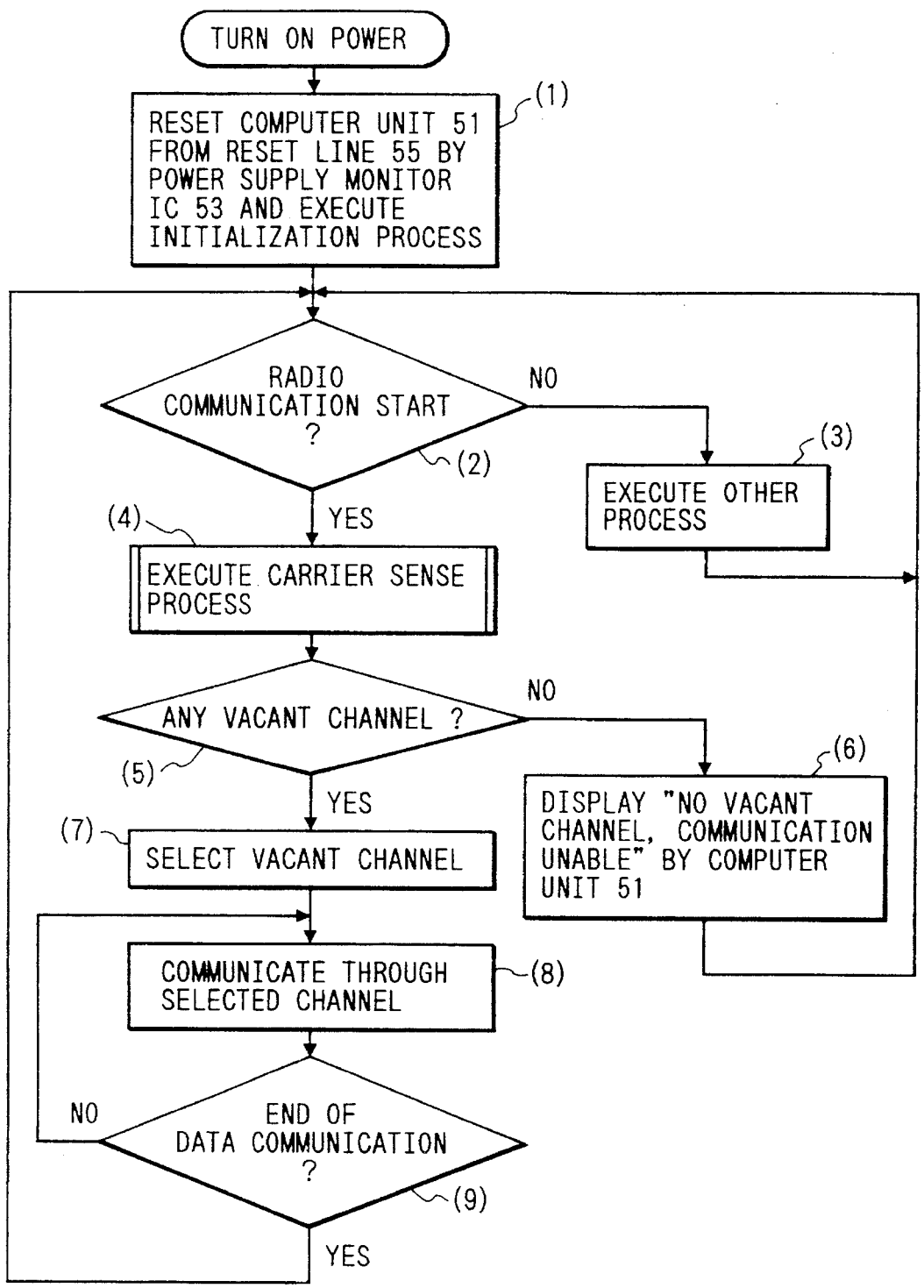
FIG. 5 is a flowchart showing one example of a second radio communication processing procedure in the portable electronic device according to the present invention.

FIG. 5 is a flowchart showing one example of a second radio communication processing procedure in a portable electronic device according to the present invention. Note that (1) to (9) indicate each step.

First, if power switch 52 is turned on, the reset control signal lines 79, 75 are at "LOW" in the initial state, whereby the counter 59 carries out after the elapse of e.g., 30 msec, the flip-flop 70 sets the output Q to "HIGH", the relay driving circuit 73 turns on the relay switch 56, the computer unit 51 is reset via the reset line 55 and sets the reset control signal line 79 to "HIGH", and then initialization process is executed (1).

Then, the computer unit 51 is checked to determine whether to start the radio communication (2), in which if the answer is NO, the computer unit 51 executes other process (3) and the procedure returns to step (2).

On the other hand, if the determination at step (2) is YES, the radio transmit-receive unit 62 receives all the channels one by one to execute carrier sense process (the detail procedure will be described later) for retrieving the channel having a predetermined electric field strength or less. Then, the presence or absence of any vacant channel is determined (5), in which if the answer is NO, the computer unit 51 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through the selected channel, that is, the computer unit 51 communicates data with the radio transmit-receive unit 62 via the communication line 77, with data exchange (8), and the end of data communication is judged (9), in which the procedure returns to step (2) if the answer is YES, or otherwise to step (8).

Figure 6:
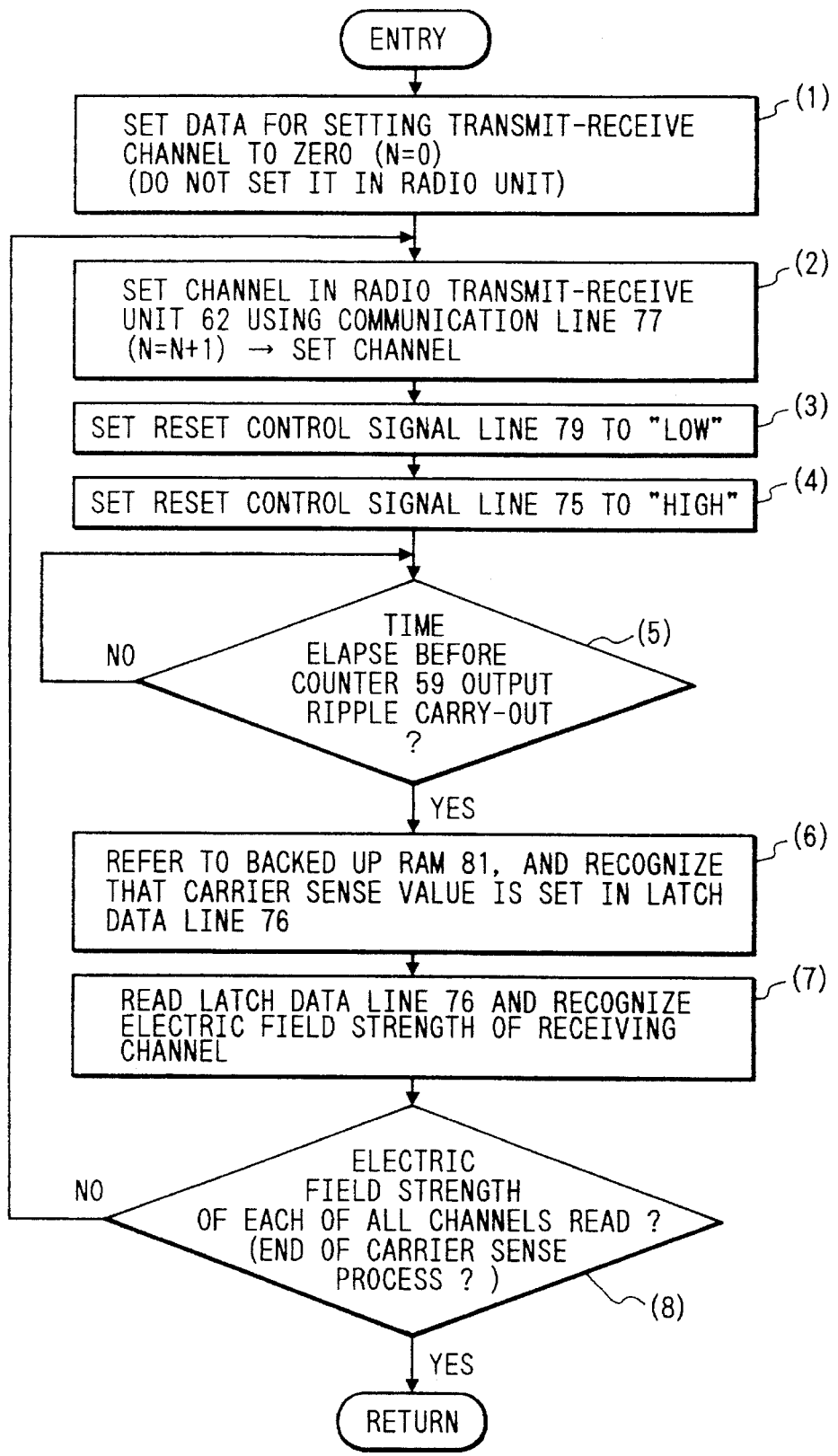
FIG. 6 is a flowchart showing in detail one example of a carrier sense processing procedure as shown in FIG. 5.

Referring now to flowchart as shown in FIG. 6, processing operation of carrier sense as shown in FIG. 5 will be described below.

FIG. 6 is a flowchart showing in detail one example of a carrier sense processing procedure as shown in FIG. 5. Note that (1) to (8) indicate each step.

First, data for setting transmit-receive channel is set to zero (1). At this step, the radio transmit-receive unit 62 has no channel setting. Then, the computer unit 51 sets channel (N=N+1) in the radio transmit-receive unit 62 (2). Then, the reset control signal line 79 is set to "LOW" (3), and subsequently the reset control signal line 75 is set to "HIGH" (4). Thereby, the flip-flop 70 is reset, the output Q is at "LOW", the relay driving circuit 73 is kept in the off state, and the power supply to the computer unit 51 is kept in the off state. Therefore, the reset control signal line 75 is kept in the off state.

Then, the procedure waits for a predetermined time to elapse until the counter 59 outputs a ripple carry-out (5). If the counter 59 outputs a ripple carry-out after the elapse of e.g., 30 msec, the Q output of flip-flop 70 is kept in "HIGH" state, the relay driving circuit 73 is kept in "ON" state, and the power supply to the computer unit 51 is turned on. However, the reset control signal lines 75, 79 are kept in "LOW" state, because the computer 51 has a high impedance when the power is turned on.

Then, if a ripple carry-out is output, backed up RAM 81 is referred to and it is recognized that a carrier sense value is set in the latch data line 76 (6). Then, latch data latched in the latch circuit 60 is read via the latch data line 76 to recognize the electric field strength of receiving channel (7). Then, a determination is performed as to whether or not the signal strength of each of all the channels is read (N=10 (where channel number N is e.g., from 1 to 10)) (9), in which if the answer is YES, the procedure returns to main procedure, or otherwise returns to step (2) to repeat the above processing.

As above described, in the present invention, if a communication processing request from the radio transmit-receive unit occurs, control means sets the system state of the computer unit being activated to a rest state, clocking means starts clocking the signal receiving time of the radio transmit-receive unit when the system state of the computer unit is kept in rest state, and holding means holds electric field strength of carrier received by the radio transmit-receive unit upon the termination of clocking by the timer means. And the control means switches the system state of the computer unit being at rest to an active state, based on the end state of clocking by the timer means, to restart the activation of the computer unit, whereby the radio transmit-receive unit can perform the communication processing stably, without being affected by high frequency noise arising with the system activation of the computer unit.

Also, the control means is configured to set the system state to a rest state by shutting down the power supply to the computer unit, whereby the radio transmit-receive unit can perform the communication processing stably, without being affected by high frequency noise arising with the system activation of the computer unit, by stopping the occurrence of high frequency noise of the computer unit temporarily.

Further, the control means is configured to set the system state to a rest state by resetting the computer unit, whereby the radio transmit-receive unit can perform the communication processing stably, while the influence of high frequency noise arising with the system activation of the computer unit is relieved by suppressing the occurrence of high frequency noise of the computer unit temporarily.

Accordingly, there is the effect that an inexpensive and small apparatus can be provided, with looser limitations in the circuit arrangement between the computer unit and the radio transmit-receive unit, and a simpler shielding measure for the computer unit.

Figure 7:
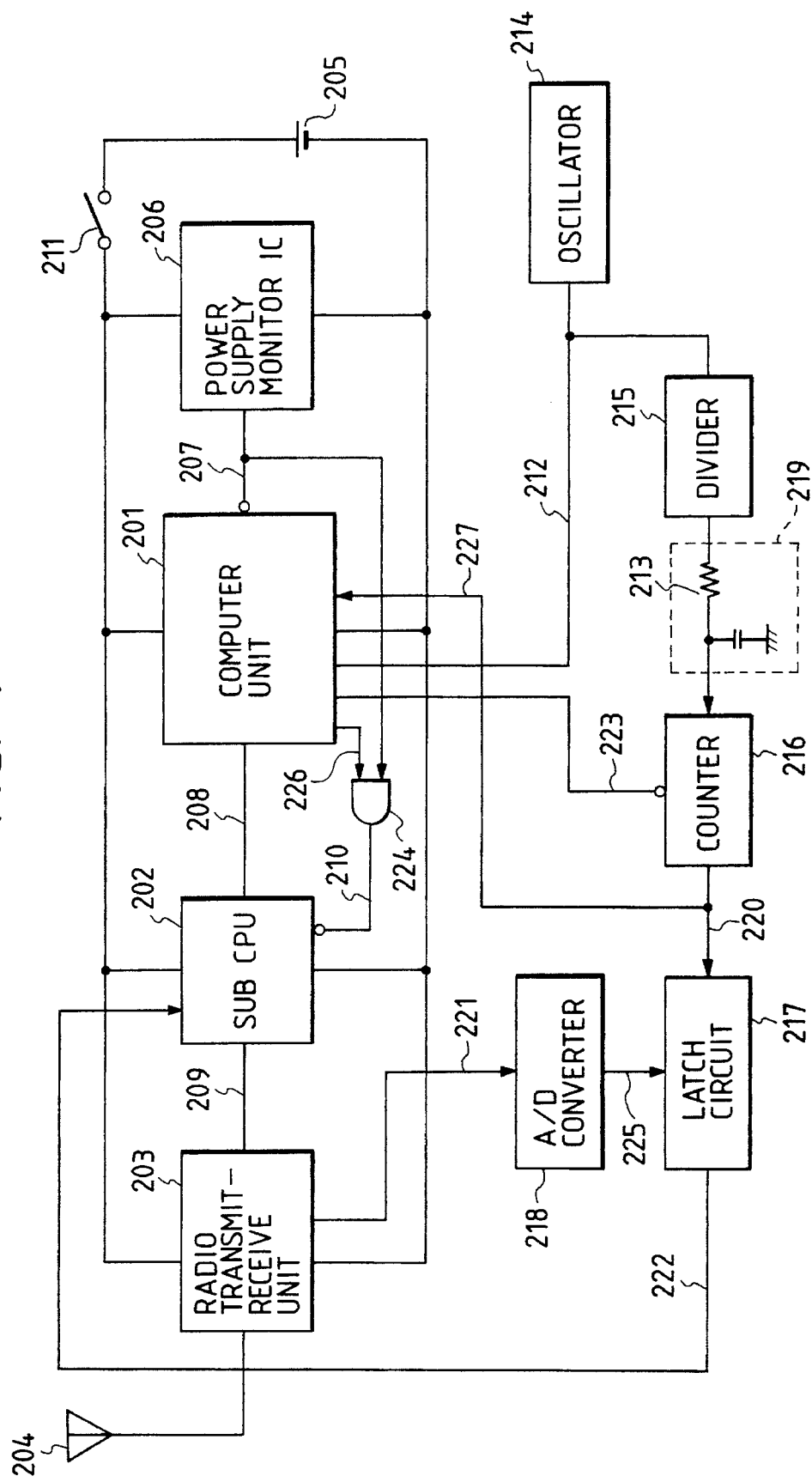
FIG. 7 is a block diagram for explaining a configuration of a portable electronic device according to another embodiment of the present invention.

FIG. 7 is a block diagram for explaining a configuration of a portable electronic device according to one embodiment of the present invention.

In the figure, 201 is a computer unit, comprising a keyboard for the input of information or instructions, a display unit for displaying input information or processed result, a memory for storing data and processing procedures as shown in flowcharts as thereafter described, processing means for processing data in accordance with processing procedure stored in the memory, and communication interface for communicating the information processed by processing procedure to the outside. The computer unit 201 is connected to a sub-CPU 202 via a control line 208, the sub-CPU 202 comprising a memory for storing data and programs for executing processing procedures as shown in flowcharts as thereafter described, processing means for processing data in accordance with the program stored in the memory, and a communication interface for communicating the information processed by processing means to the outside. The sub-CPU 202 communicates with the computer unit 201 for the transmission of information. The computer unit 201 is initiated upon a clock supplied from an oscillation circuit 214 via a clock line 212 with a reset signal 207 released. The clock supplied via the clock line 212 from the oscillation circuit 214 is divided in frequency by a divider circuit 215, and an output 213 after dividing into a frequency of e.g., 2 msec is output via a low-pass filter 219 to a counter 216.

203 is a radio transmit-receive unit for communicating with an external equipment, not shown, via an antenna 204. A received electric field strength detected by the radio transmit-receive unit 203 is A/D converted by an A/D converter 218, and then latched in a latch circuit 217 via an A/D converter output line 225. The latch circuit 217 may be either of a first-in first-out system of memory and an addressing system, when storing the received electric field strength for a plurality of channels. 205 is a battery for supplying power supply voltage in accordance with the on/off state of a power supply switch 211.

206 is a power supply monitor IC for monitoring the power supply voltage state from the battery 205 to send out a reset signal via a computer reset line 207 to the computer unit 201 and an AND gate 224. The AND gate 224 sends out the reset signal via a sub-CPU reset line 210 to the sub-CPU 202, based on the reset signal and the output state from the computer unit 201. 220 is a ripple carry-out of the counter 216, 221 is a signal strength detection line, and 222 is a latch data output line for outputting electric field strength data latched in the latch circuit 217 to the sub-CPU 202. 223 is a reset line for transferring a counter control signal from the computer unit 201 to the counter 216. 209 is a control line, 226 is a reset signal from the computer unit 201 to the sub-CPU 202, and 227 is an interrupt signal.

In the portable electronic device thus constituted, if a communication processing request from the radio transmit-receive unit 203 occurs, the computer unit 201 releases the reset state of the control line 223, and sets the sub-CPU 202 to a reset state via the control line 226. Clocking means (counter 216) starts clocking upon the releasing of the reset state via the control line 223, and holding means (latch circuit 217) holds-electric field strength information of carrier (with a ripple carry-out signal 220 from the counter 216) which the radio transmit-receive unit 203 has received upon the termination of clocking by the timer means (counter 216). And the control means (computer unit 201) releases the system activation state of computer unit (sub-CPU 202) being at rest from the reset state via the control line 226, based on the end state of clocking by the timer means (counter 216) (upon the occurrence of n interrupt signal 227 from the counter 216), to restart the activation of computer unit (sub-CPU 202), whereby the radio transmit-receive unit 203 can search for available channel having a defined electric field strength or less and perform the communication processing with that channel in a stable manner, without being affected by high frequency noise arising with the operation of the computer unit (sub-CPU 202 in this embodiment).

Figure 8:
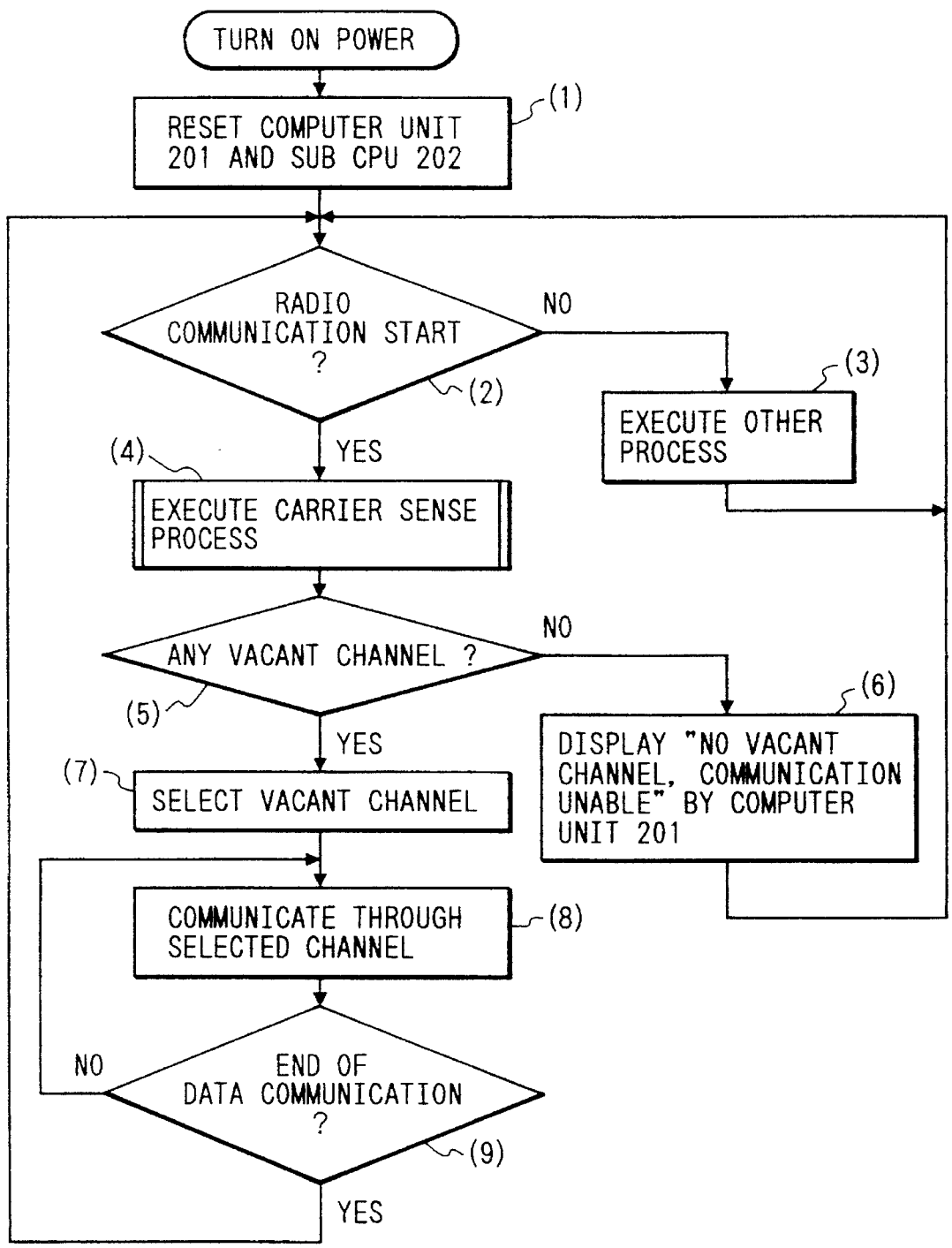
FIG. 8 is a flowchart showing one example of a first radio communication processing means in the portable electronic device according to the present invention.

FIG. 8 is a flowchart showing one example of a first radio transmit-receive processing procedure in a portable electronic device according to the present invention. Note that (1) to (9) indicate each step.

First, if power switch 211 is turned on, computer unit 201 is reset upon a reset signal sent out via the computer unit reset line 207 by the power supply monitor IC 206, and sub-CPU 202 is reset upon a reset signal sent out via the sub-CPU reset line 210 (1). Then., the computer unit 201 is checked to determine whether to start the radio communication (2), in which if the answer is NO, the computer unit 201 executes other process (3) and the procedure returns to step (2).

On the other hand, if the determination at step (2) is YES, the radio transmit-receive unit 203 receives all the channels one by one to execute carrier sense process (the detail procedure will be described later) for retrieving the channel having a predetermined electric field strength or less (4). Then, the presence or absence of any vacant channel determined (5), in which if the answer is NO, the computer unit 201 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through selected channel, that is, the computer unit 201 communicates data with the sub-CPU 202, which in turn communicates data with the radio transmit-receive unit 203 (8), and the end of data communication is judged (9), in which the procedure returns to step (2) if the answer is YES, or otherwise to step (8).

Figure 9:
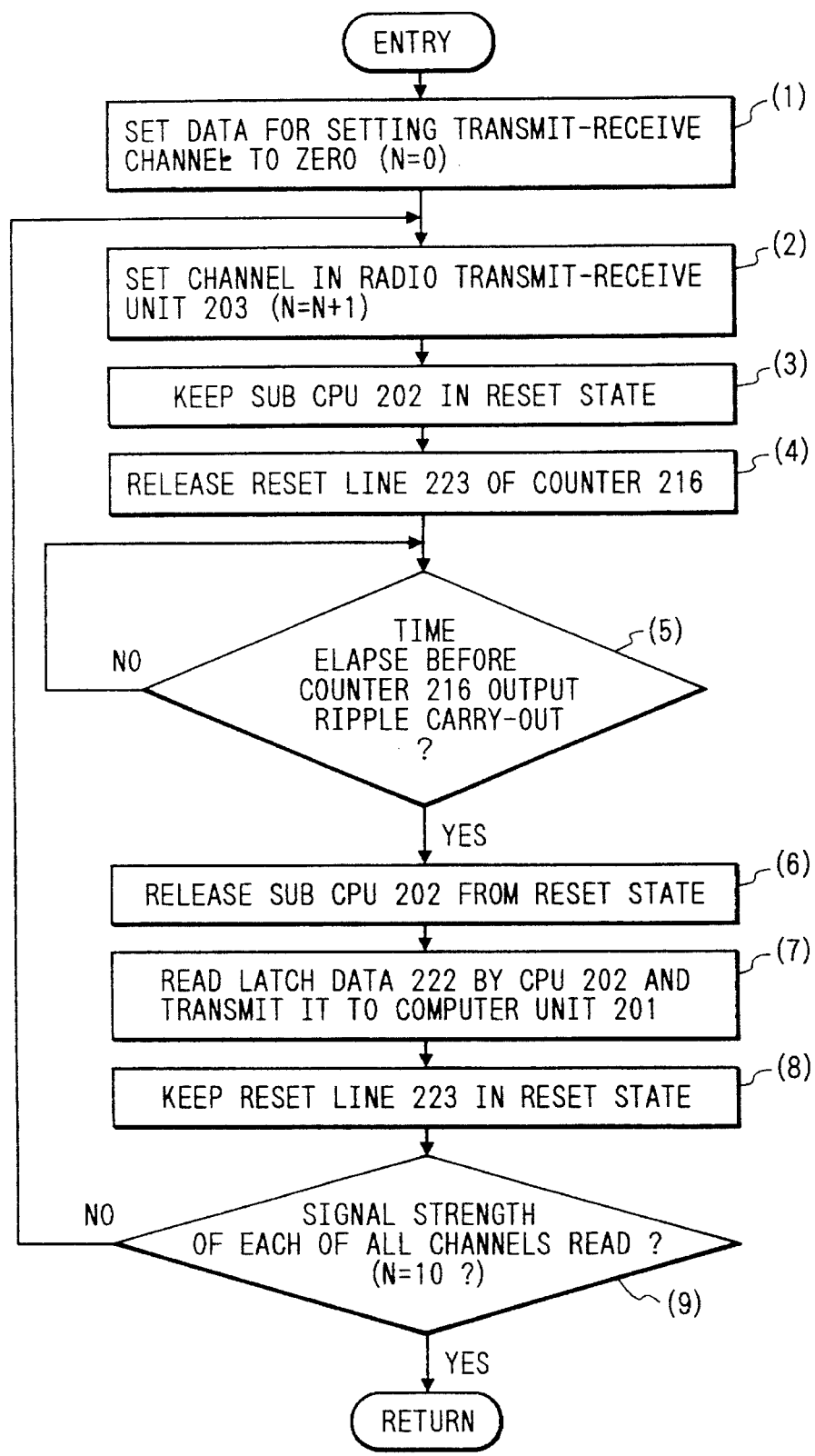
FIG. 9 is a flowchart showing in detail one example of a carrier sense processing procedure as shown in FIG. 8.

Referring now to flowchart as shown in FIG. 9, processing operation of carrier sense as shown in FIG. 8 will be described below.

FIG. 9 is a flowchart showing in detail one example of a carrier sense processing procedure as shown in FIG. 8. Note that (1) to (9) indicate each step.

First, data for setting transmit-receive channel is set to zero (1). At this step, the radio transmit-receive unit 203 has no channel setting. Then, the computer unit 201 sets channel (N=N+1) in the radio transmit-receive unit 203 via the sub-CPU 202 (2). Then, the sub-CPU 202 is kept in reset state (3), and reset line 223 of counter 216 is released (4). Then, waiting for a predetermined time to elapse until the counter 216 outputs a ripple carry-out 220 (5), and if the ripple carry-out 220 is output, the computer unit 201 senses it via interrupt line 227, and the sub-CPU 202 is released from reset state upon the reset signal (6). Then, ripple carry-out signal 220 is output by a processing to be carried out during waiting time of the above step (5), that is, if the input of the counter 216 is counted (2 msec for one period) by, for example, fifteen times, and latch data latched in latch circuit 217 by a processing of latching the value of A/D converter 218 in latch circuit 217 is read by the sub-CPU 202 via the latch data output line 222, and transmitted via the control line 208 to the computer unit 201 (7).

Then, the reset line 223 is kept in reset state (8). And a determination is performed as to whether or not the signal strength of each of all the channels is read (N=10 (where channel number N is e.g., from 1 to 10)) (9), in which if the answer is YES, the procedure returns to main procedure, or otherwise returns to step (2) to repeat the above processing.

In the above embodiment, the radio transmit-receive unit 203 is prevented from experiencing influence of noise arising in the processing of the sub-CPU 202 by resetting the sub-CPU 202 for a certain time until electric field strength output data of the radio transmit-receive unit 203 is held.

Figure 10:
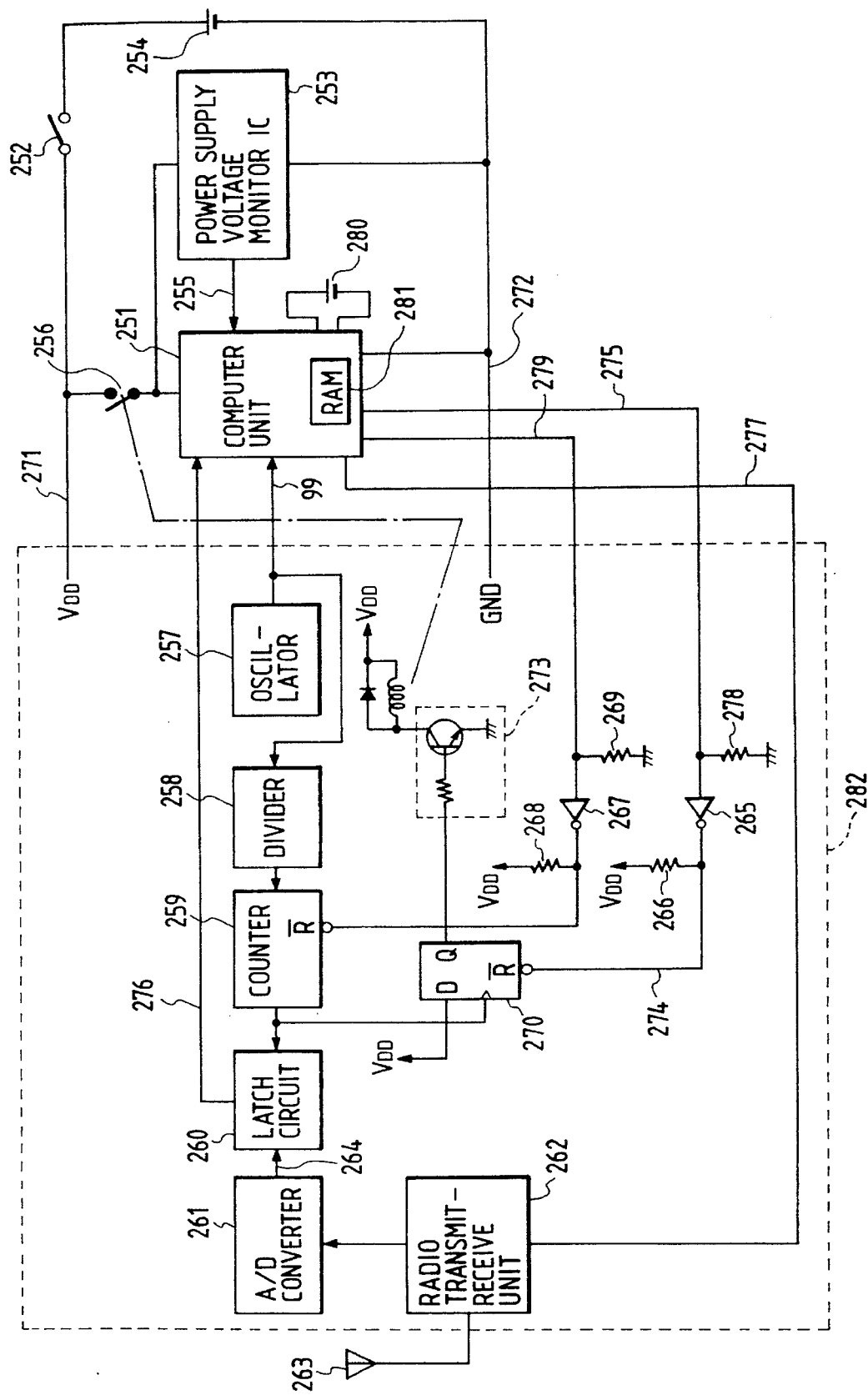
FIG. 10 is a block diagram for explaining a configuration of a portable electronic device according to another embodiment of the present invention.

FIG. 10 is a block diagram for explaining a configuration of a portable electronic device according to another embodiment of the present invention.

In the figure, 251 is a computer unit containing RAM 281, the contents of RAM 281 held by a backup battery 280 (consisting of lithium battery). The computer unit 251 is initiated by the clock supplied via a clock line 299 from an oscillator 57 upon the releasing of the reset on the reset line 255.

254 is a battery for supplying a constant power supply voltage to the circuit in accordance with the on/off state of a power supply switch 252. 253 is a power supply voltage monitor IC for monitoring the voltage state to be applied to the computer unit 251 to send out a reset signal via a reset line 255 to the computer unit 251. 256 is a relay switch which is switched on/off by a relay drive circuit 273. 258 is a divider circuit for dividing in frequency the clock supplied via a clock line from the oscillator 257 to send out divided clock having a predetermined frequency to a counter circuit 259. 260 is a latch circuit for latching received electric field strength, which is detected by the radio transmit-receive unit 262 and then transmitted via an A/D converter output line 264 after A/D conversion by an A/D converter 261. 263 is an antenna, 265 is an open collector inverter which sends out a reset signal to a flip-flop 270 depending on the state of a reset control signal input via a reset control signal line 275 to which a resistor 278 having its one end grounded is connected. 274 is a reset line for outputting the reset signal output from the open collector inverter 265 to the flip-flop 270. The reset line 274 is pulled up by the resistor 266.

267 is an open collector inverter which sends out the reset signal to the counter circuit 259 depending on the state of control signal input via a reset control signal line 279 to which a resistor 269 having its one end grounded is connected. 268 is a resistor for pulling up the voltage of counter input line. 282 is a substrate the packaged chip components of which are driven by a power supply VDD from a power supply line 271. 272 is a ground line with its one end connected to a ground line GND of the substrate 282. 276 is a latch data line for transferring received electric field strength latched in the latch circuit 260 into the computer unit 251. 277 is a communication line.

Figure 11:
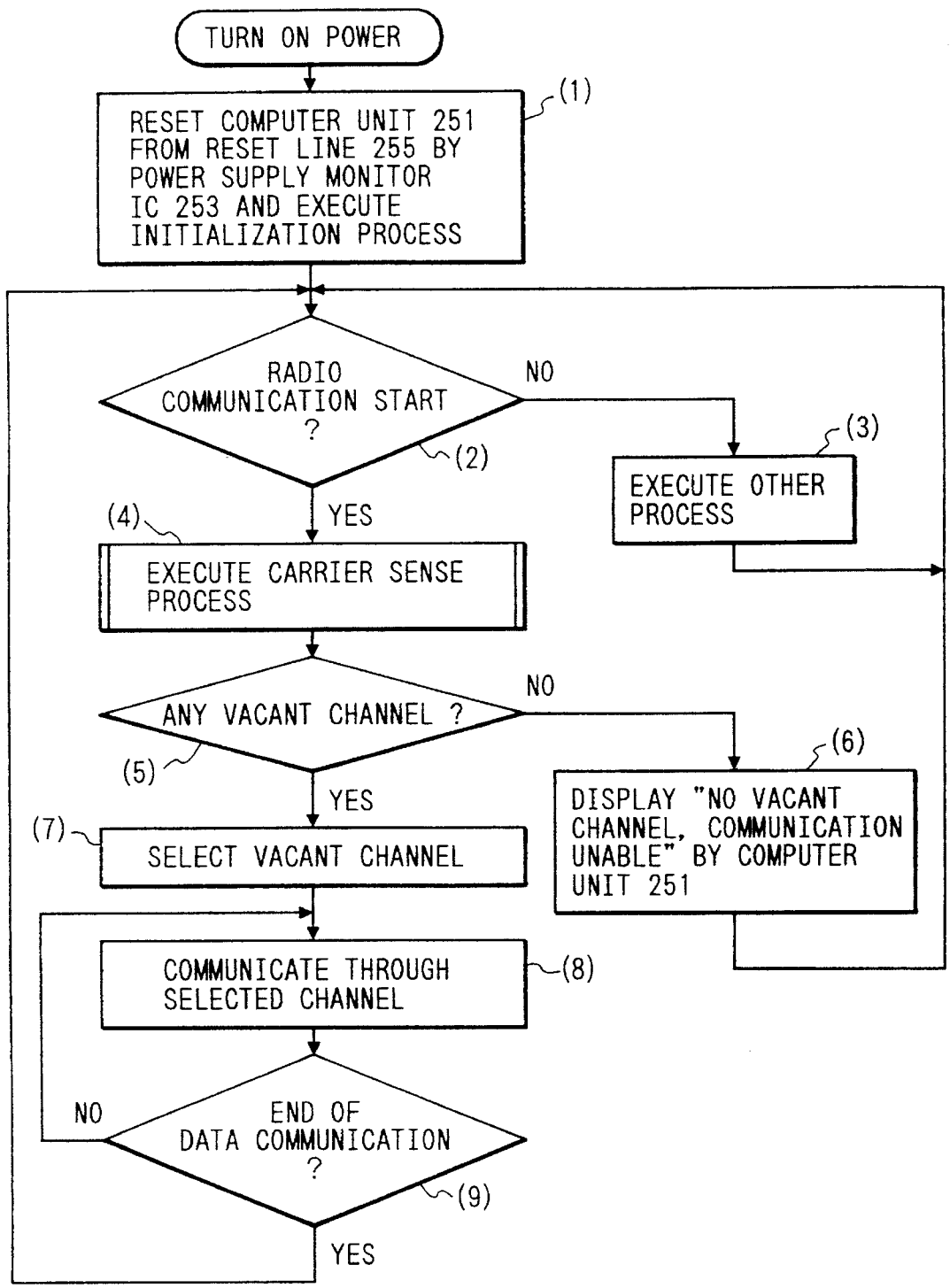
FIG. 11 is a flowchart showing one example of a second radio communication processing means in the portable electronic device according to the present invention.

FIG. 11 is a flowchart showing one example of a second radio communication processing procedure in a portable electronic device according to the present invention. Note that (1) to (9) indicate each step.

First, if power switch 252 is turned on, the reset control signal lines 279, 275 are at "LOW" in the initial state, whereby the counter 259 carries out after the elapse of e.g., 30 msec, the flip-flop 270 sets the output Q to "HIGH", the relay driving circuit 273 turns on the relay switch 256, the computer unit 251 is reset via the reset line 255 and sets the reset control signal 279 to "HIGH", and then initialization process is executed (1).

Then, the computer unit 251 is checked to determine whether to start the radio communication (2), in which if the answer is NO, the computer unit 251 executes other process (3) and the procedure returns to step (2).

On the other hand, if the determination at step (2) is YES, the radio transmit-receive unit 262 receives all the channels one by one to execute carrier sense process (the detail procedure will be described later) for retrieving the channel having a predetermined electric field strength or less (4). Then, the presence or absence of any vacant channel is determined (5), in which if the answer is NO, the computer unit 251 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through selected channel, that is, the computer unit 251 communicates data with the radio transmit-receive unit 262 via the communication line 277, with data exchange (8), and the end of data communication is judged (9), in which the procedure returns to step (2) if the answer is YES, or otherwise to step (8).

Figure 12:
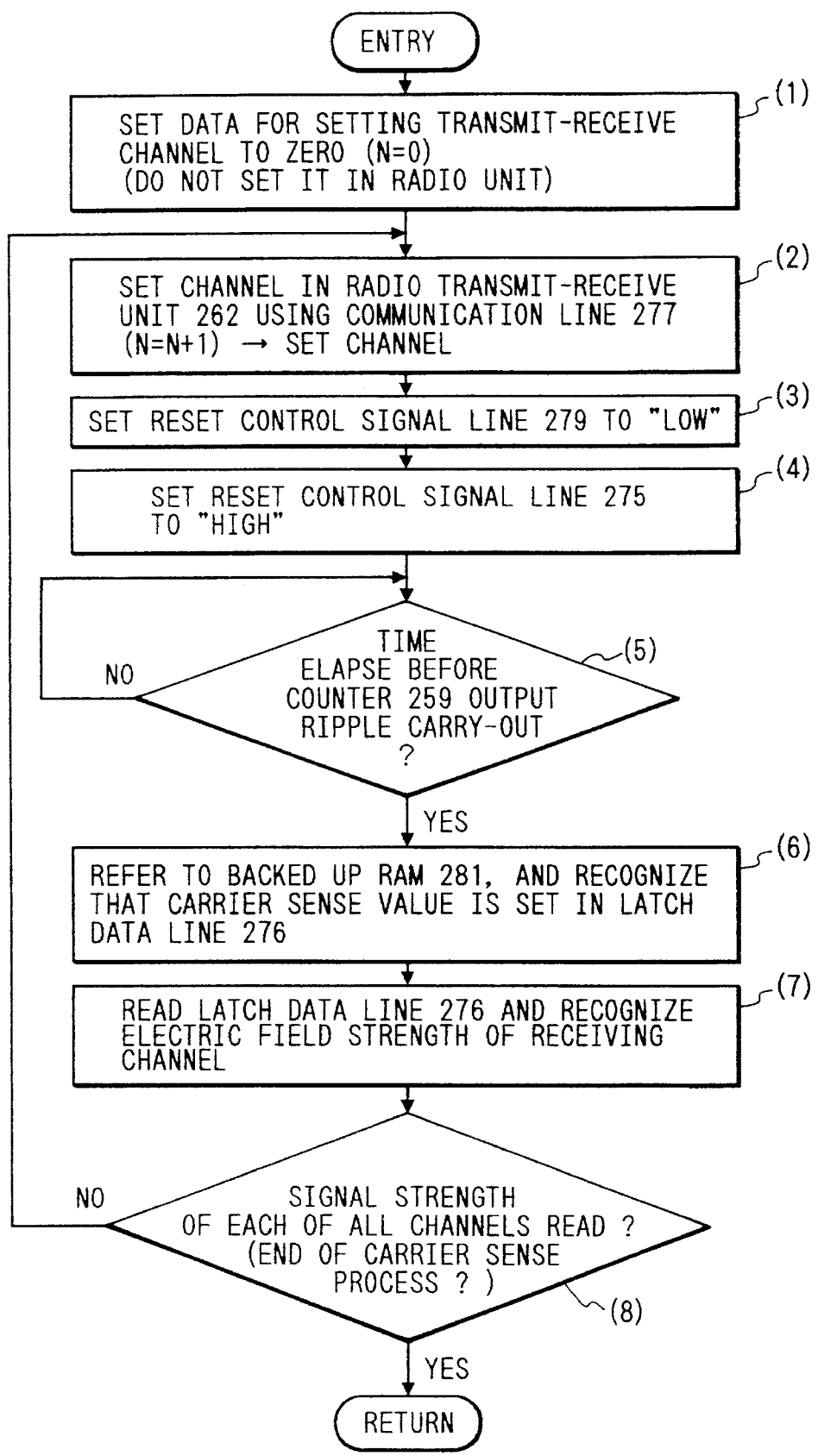
FIG. 12 is a flowchart showing in detail one example of a carrier sense processing procedure as shown in FIG. 11.

Referring now to flowchart as shown in FIG. 12, processing operation of carrier sense as shown in FIG. 11 will be described below.

FIG. 12 is a flowchart showing in detail one example of a carrier sense processing procedure as shown in FIG. 11. Note that (1) to (8) indicate each step.

First, data for setting transmit-receive channel is set to zero (1). At this step, the radio transmit-receive unit 262 has no channel setting. Then, the computer unit 251 sets channel (N=N+1) in the radio transmit-receive unit 262 (2). Then, the reset control signal line 279 is set to "LOW" (3), and subsequently the reset control signal line 275 is set to "HIGH" (4). Thereby, the flip-flop 270 is reset, the output Q is at "LOW", the relay driving circuit 273 is kept in the off state, and the power supply to the computer unit 251 is kept in the off state. Therefore, the reset control signal lines 275, 279 are kept in "LOW".

Then, the procedure waits for a predetermined time to elapse until the counter 259 outputs a ripple carry-out (5). If the counter 259 outputs a ripple carry-out after the elapse of e.g., 30 msec, the Q output of flip-flop 270 is kept in "HIGH" state, the relay driving circuit 273 is kept in "ON" state, and the power supply to the computer unit 251 is turned on. However, the reset control signal lines 275, 279 are kept in "LOW" state owing to resistors 269, 278, because there is no output from the computer unit 251 when the power of computer unit 251 is turned on.

Then, the computer unit 251 refers to backed up RAM 281 and recognizes that a carrier sense value is set in the latch data line 276 (6). (the computer unit is turned off by the flag state of RAM 281, because of a carrier sense processing, and reset via the reset line 255, thereby recognizing the initiation.) Then, latch data latched in the latch circuit 60 is read via the latch data line 276 to recognize the electric field strength of receiving channel (7). Then, a determination is performed as to whether or not the signal strength of each of all the channels is read (N=10 (where channel number N is e.g., from 1 to 10)) (8), in which if the answer is YES, the procedure returns to main procedure, or otherwise returns to step (2) to repeat the above processing.

Figure 13:
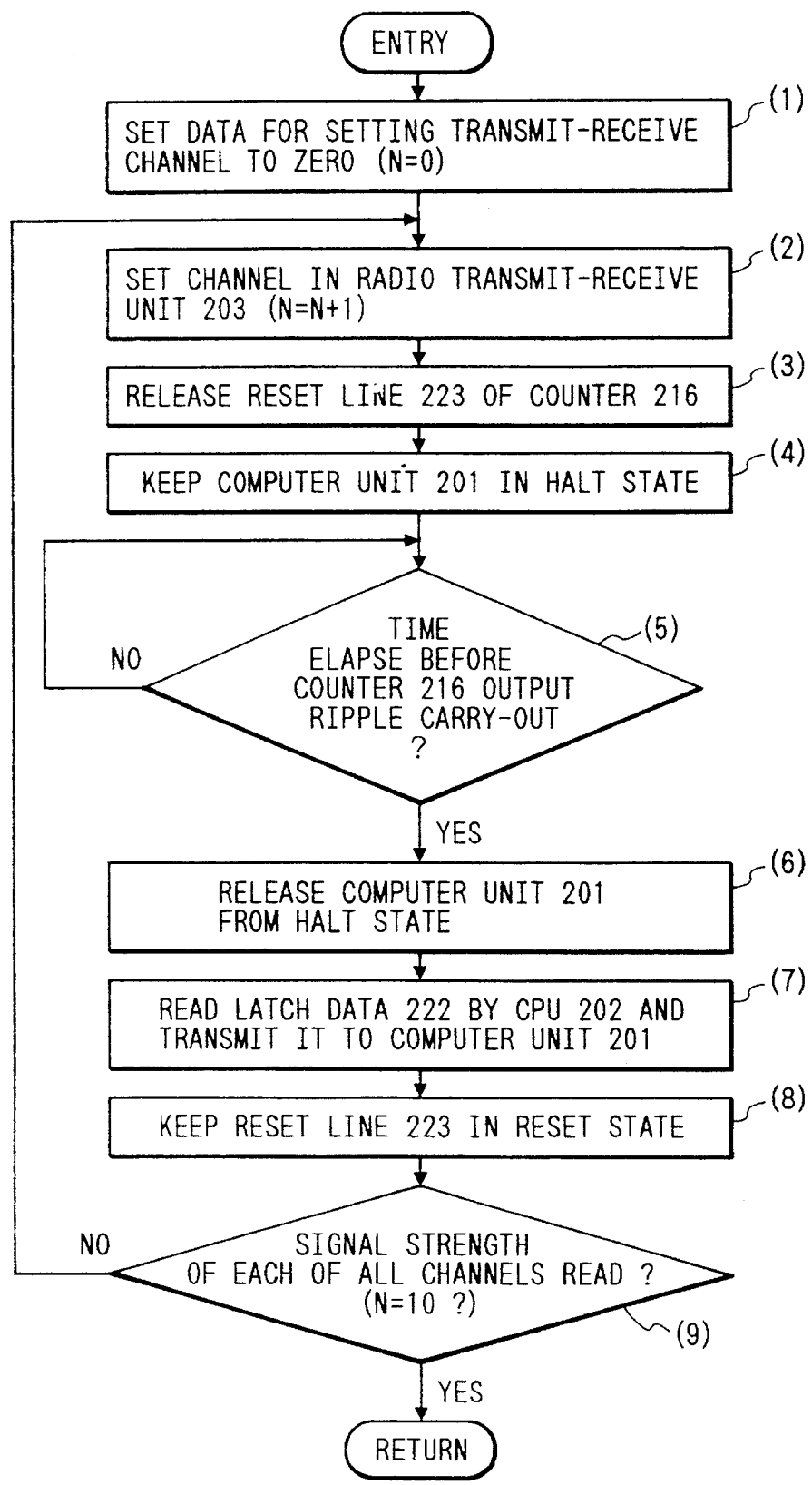
FIG. 13 is a flowchart showing in detail another example of a carrier sense processing procedure as shown in FIG. 8.

FIG. 13 is a flowchart showing another embodiment of the present invention. Note that the block diagram and the main flowchart are the same as those of embodiment shown in FIGS. 7 and 8.

Referring now to flowchart as shown in FIG. 13, processing operation of carrier sense as shown in FIG. 8 will be described below.

FIG. 13 is a flowchart showing in detail one example of a carrier sense processing procedure as shown in FIG. 8. Note that (1) to (9) indicate each step.

First, data for setting transmit-receive channel is set to zero (1). At this step, the radio transmit-receive unit 203 has no channel setting. Then, the computer unit 201 sets channel (N=N+1) in the radio transmit-receive unit 203 via the sub-CPU 202 (2). Then, the computer unit 201 releases the reset line 223 of counter 216 (3), and keeps the sub-CPU 202 in halt state by executing a halt instruction (4). Then, waiting for a predetermined time to elapse until the counter 216 outputs a ripple carry-out 220 (5), and if the ripple carry-out 220 is output, the computer unit 201 is released from the halt state via the interrupt line 227 (6). Then, ripple carry-out signal 220 is output by a processing to be carried out during waiting time of the above step (5), that is, if the input of the counter 216 is counted (2 msec for one period) by, for example, fifteen times, and latch data latched in latch circuit 217 by a processing of latching the value of A/D converter 218 in latch circuit 217 is read by the sub-CPU 202 via the latch data output line 222, and transmitted via the control line 208 to the computer unit 201 (7).

Then, the reset line 223 is kept in reset state (8). And a determination is performed as to whether or not the signal strength of each of all the channels is read (N=10 (where channel number N is e.g., from 1 to 10)) (9), in which if the answer is YES, the procedure returns to main procedure, or otherwise returns to step (2) to repeat the above processing.

In the above embodiment, the radio transmit-receive unit 203 is prevented from experiencing influence of noise arising in the processing of the computer unit 201 by halting the computer unit 201 for a certain time until electric field strength output data of the radio transmit-receive unit 203 is held.

Figure 14:
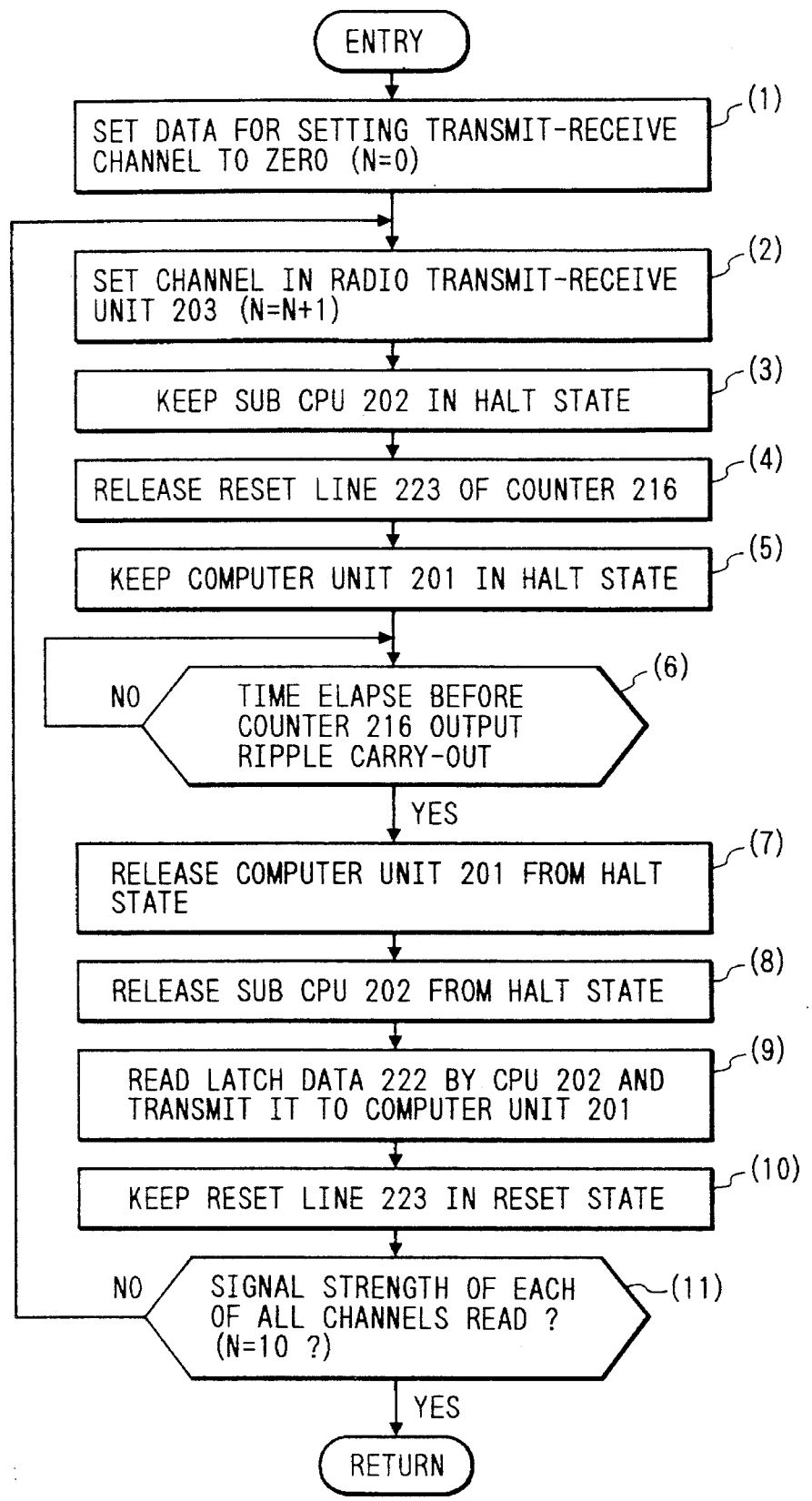
FIG. 14 is a flowchart showing in detail still another example of a carrier sense processing procedure as shown in FIG. 8.

FIG. 14 is a flowchart showing another embodiment of the present invention. Note that the block diagram and the main flowchart are the same as those of embodiment shown in FIGS. 7 and 8.

Referring now to flowchart as shown in FIG. 14, processing operation of carrier sense as shown in FIG. 8 will be described below.

FIG. 14 is a flowchart showing in detail one example of a carrier sense processing procedure as shown in FIG. 8. Note that (1) to (11) indicate each step.

First, data for setting transmit-receive channel is set to zero (1). At this step, the radio transmit-receive unit 203 has no channel setting. Then, the computer unit 201 sets channel (N=N+1) in the radio transmit-receive unit 203 via the sub-CPU 202 (2). Then, the computer unit 201 keeps the sub-CPU2 in halt state (3), releases the reset line 223 of counter 216 (4), and keeps itself in halt state (5). Then, waiting for a predetermined time to elapse until the counter 216 outputs a ripple carry-out 220 (6), and if the ripple carry-out 220 is output, the computer unit 201 releases itself from the halt state via the interrupt line 227 (7). Then, the computer unit 201 releases the sub-CPU 202 from the halt state (8). Then, ripple carry-out signal 220 is output by a processing to be carried out during waiting time of the above step (6), that is, if the input of the counter 216 is counted (2 msec for one period) by, for example, fifteen times, and latch data latched in latch circuit 217 by a processing of latching the value of A/D converter 218 in latch circuit 217 is read by the sub-CPU 202 via the latch data output line 222, and transmitted via the control line 208 to the computer unit 201 (9).

Then, the reset line 223 is kept in reset state (10). And a determination is performed as to whether or not the signal strength of each of all the channels is read (N=10, where channel number N is e.g., from 1 to 10) (11), in which if the answer is YES, the procedure returns to main procedure, or otherwise returns to step (2) to repeat the above processing.

In the above embodiment, the radio transmit-receive unit 203 is prevented from experiencing influence of noise arising in the processing of the computer unit 201 and the sub-CPU 202 by halting the computer unit 201 and the sub-CPU 202 for certain time until electric field strength output data of the radio transmit-receive unit 203 is held.

Figure 15:
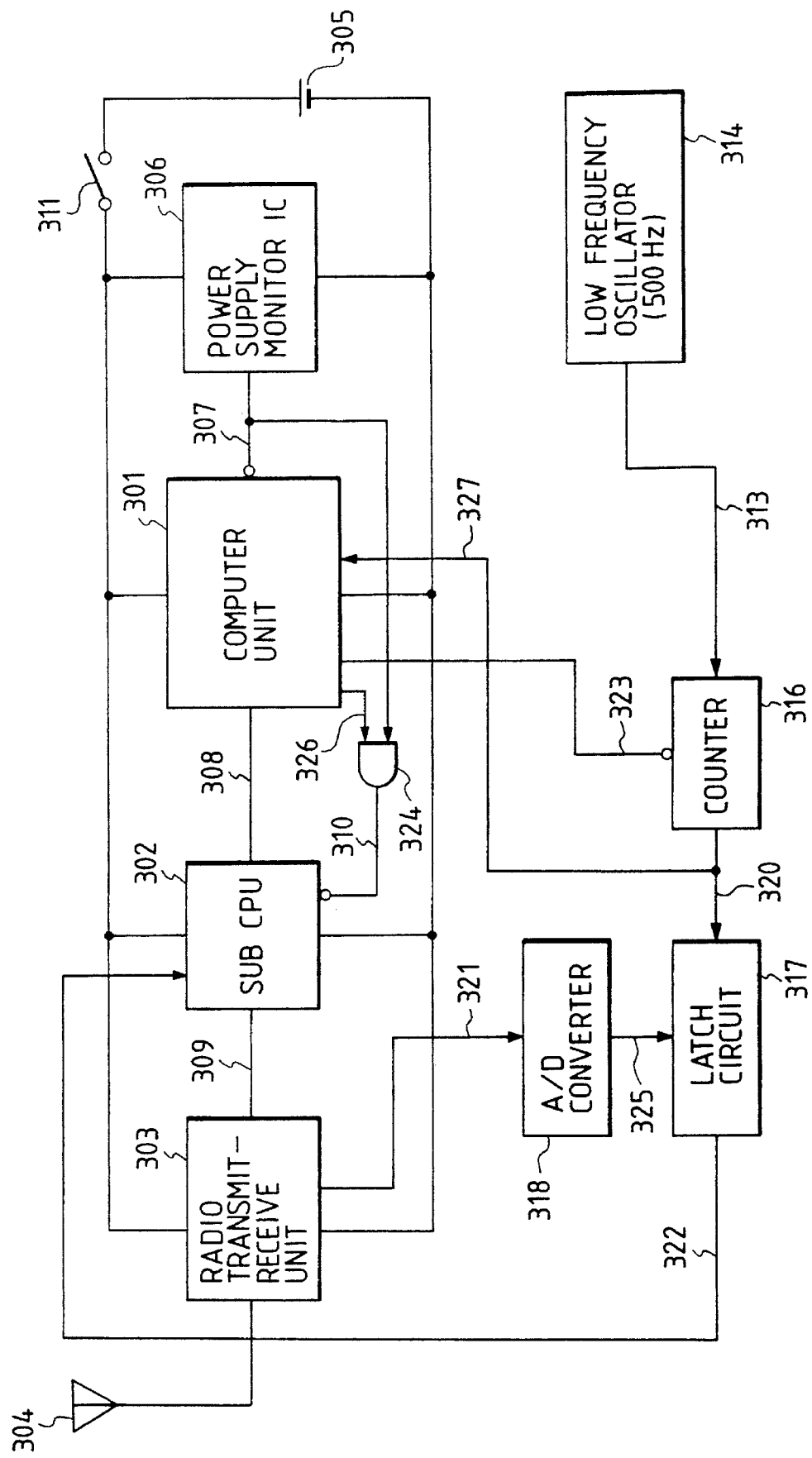
FIG. 15 is a block diagram for explaining a configuration of a portable electronic device according to another embodiment of the present invention.

FIG. 15 is a block diagram for explaining a configuration of a portable electronic device according to one embodiment of the present invention.

In the figure, 301 is a computer unit, comprising a keyboard for the input of information or instructions, a display unit for displaying input information or processed result, a memory for storing data and processing procedures as shown in flowcharts as thereafter described, processing means for processing data in accordance with processing procedure stored in the memory, and communication interface for communicating the information processed by processing procedure to the outside. The computer unit 301 is connected to a sub-CPU 302 via a control line 308, the sub-CPU 302 comprising a memory for storing data and programs for executing processing procedures as shown in flowcharts as thereafter described, processing means for processing data in accordance with the program stored in the memory, and a communication interface for communicating the information processed by processing procedure to the outside. The sub-CPU 302 communicates with the computer unit 301 for the transmission of information. The computer unit 301 is initiated upon a clock supplied from an oscillation circuit 314 via a clock line 312 with a reset signal 307 released. The clock supplied via the clock line 312 from the oscillation circuit 314 is divided in frequency by a divider circuit 315, and an output 313 after dividing into a frequency of e.g., 2 msec is output via a low-pass filter 319 to a counter 316.

303 is a radio transmit-receive unit for communicating with an external equipment, not shown, via an antenna 304. A received electric field strength detected by the radio transmit-receive unit 303 is A/D converted by an A/D converter 318, and then latched in a latch circuit 317 via an A/D converter output line 325. The latch circuit 317 may be either of a first-in first-out system of memory and an addressing system, when storing the received electric field strength for a plurality of channels. 305 is a battery for supplying power supply voltage in accordance with the on/off state of a power supply switch 311.

306 is a power supply monitor IC for monitoring the power supply voltage state from the battery 305 to send out a reset signal via a computer reset line 307 to the computer unit 301 and an AND gate 324. The AND gate 324 sends out the reset signal via a sub-CPU reset line 310 to the sub-CPU 302, based on the reset signal and the output state from the computer unit 301. 320 is a ripple carry-out of the counter 316, 321 is a signal strength detection line, and 322 is a latch data output line for outputting electric field strength data latched in the latch circuit 317 to the sub-CPU 302. 323 is a reset line for transferring a counter control signal from the computer unit 301 to the counter 316. 309 is a control line, 326 is a reset signal from the computer unit 301 to the sub-CPU 302, and 327 is an interrupt signal.

In the portable electronic device thus constituted, if a communication processing request from the radio transmit-receive unit 303 occurs, the computer unit 301 releases the reset state of the control line 323, and sets the sub-CPU 302 to a reset state via the control line 326. Clocking means (counter 316) starts clocking upon the releasing of the reset state on the control line 323, and holding means (latch circuit 317) holds electric field strength information of carrier (With a ripple carry-out signal 320 from the counter 316) which the radio transmit-receive unit 303 has received upon the termination of clocking by the timer means (counter 316). And the control means (computer unit 301) releases the system activation state of computer unit (sub-CPU 302) being at rest from the reset state via the control line 326, based on the end state of clocking by the timer means (counter 316) (upon the occurrence of an interrupt signal 327 from the counter 316), to restart the activation of computer unit (sub-CPU 302), whereby the radio transmit-receive unit 303 can search for available channel having a defined electric field strength or less and perform the communication processing with that channel in a stable manner, without being affected by high frequency noise arising with the operation of the computer unit (sub-CPU 302 in this embodiment).

Figure 16:
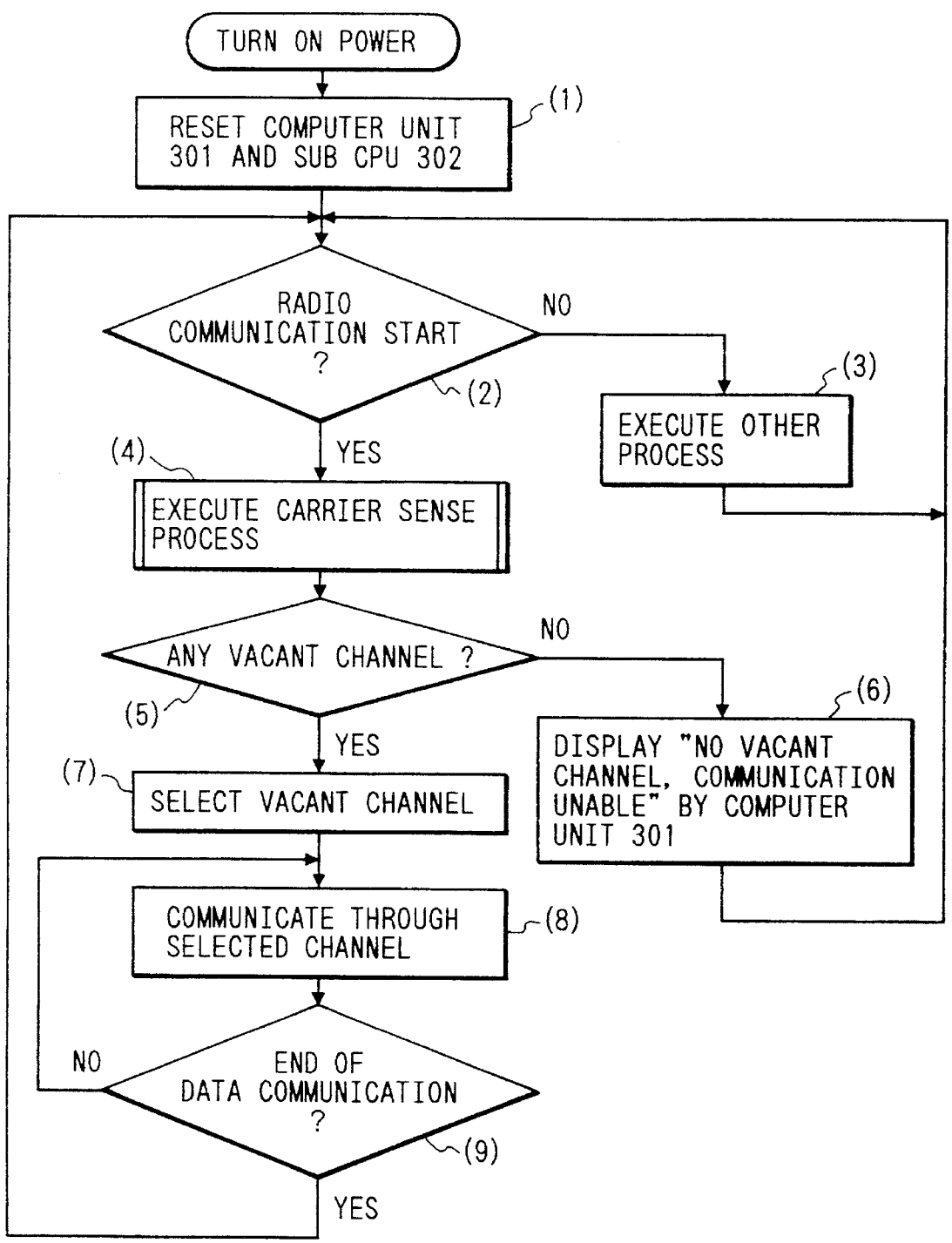
FIG. 16 is a flowchart showing one example of a first radio communication processing means in the portable electronic device according to the present invention.

FIG. 16 is a flowchart showing one example of a first radio communication processing procedure in a portable electronic device according to the present invention. Note that (1) to (9) indicate each step.

First, if power switch 311 is turned on, computer unit 301 is reset upon a reset signal sent out via the computer unit reset line 307 by the power supply monitor IC 306, and sub-CPU 302 is reset upon a reset signal sent out via the reset line 310 of sub-CPU 302 (1). Then, the computer unit 301 is checked to determine whether to start the radio communication (2), in which if the answer is NO, the computer unit 301 executes other process (3) and the procedure returns to step (2).

On the other hand, if the determination at step (2) is YES, the radio transmit-receive unit 303 receives all the channels one by one to execute carrier sense process (the detail procedure will be described later) for retrieving the channel having a predetermined electric field strength or less (4). Then, the presence or absence of any vacant channel is determined (5), in which if the answer is NO, the computer unit 301 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through selected channel, that is, the computer unit 301 communicates data with the sub-CPU 302, which in turn communicates data with the radio transmit-receive unit 303 (8), and the end of data communication is judged (9), in which the procedure returns to step (2) if the answer is YES, or otherwise to step (8).

Figure 17:
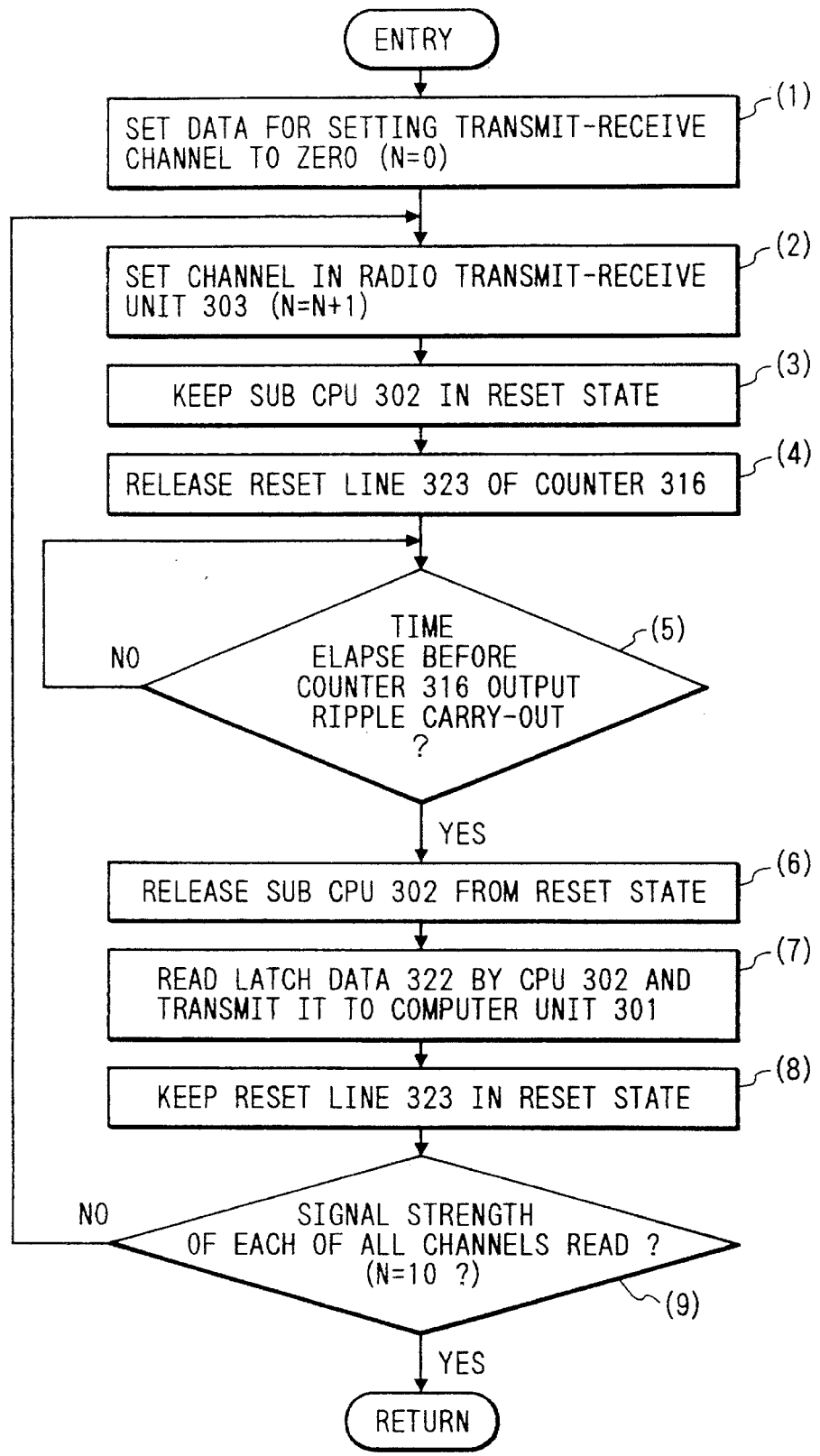
FIG. 17 is a flowchart showing in detail one example of a carrier sense processing procedure as shown in FIG. 16.

Referring now to flowchart as shown in FIG. 17, processing operation of carrier sense as shown in FIG. 16 will be described below.

FIG. 17 is a flowchart showing in detail one example of a carrier sense processing procedure as shown in FIG. 16. Note that (1) to (9) indicate each step.

First, data for setting transmit-receive channel is set to zero (1). At this step, the radio transmit-receive unit 303 has no channel setting. Then, the computer unit 301 sets channel (N=N+1) in the radio transmit-receive unit 303 via the sub-CPU 302 (2). Then, the sub-CPU 302 is kept in reset state (3), and reset line 323 of counter 316 is released (4). Then, waiting for a predetermined time to elapse until the counter 316 outputs a ripple carry-out 320 (5), and if the ripple carry-out 320 is output, the computer unit 301 senses it via interrupt line 327, and the sub-CPU 302 is released from reset state upon the reset signal 326 (6). Then, ripple carry-out signal 320 is output by a processing to be carried out during waiting time of the above step (5), that is, if the input of the counter 316 is counted (2 msec for one period) by, for example, fifteen times, and latch data latched in latch circuit 317 by a processing of latching the value of A/D converter 318 in latch circuit 317 is read by the sub-CPU 302 via the latch data output line 322, and transmitted via the control line 308 to the computer unit 301 (7).

Then, the reset line 323 is kept in reset state (8). And a determination is performed as to whether or not the signal strength of each of all the channels is read (N=10 (where channel number N is e.g., from 1 to 10)) (9), in which if the answer is YES, the procedure returns to main procedure, or otherwise returns to step (2) to repeat the above processing.

In the above embodiment, the radio transmit-receive unit 303 is prevented from experiencing influence of noise arising in the processing of the sub-CPU 302 by resetting the sub-CPU 302 for a certain time until electric field strength output data of the radio transmit-receive unit 303 is held.

Figure 18:
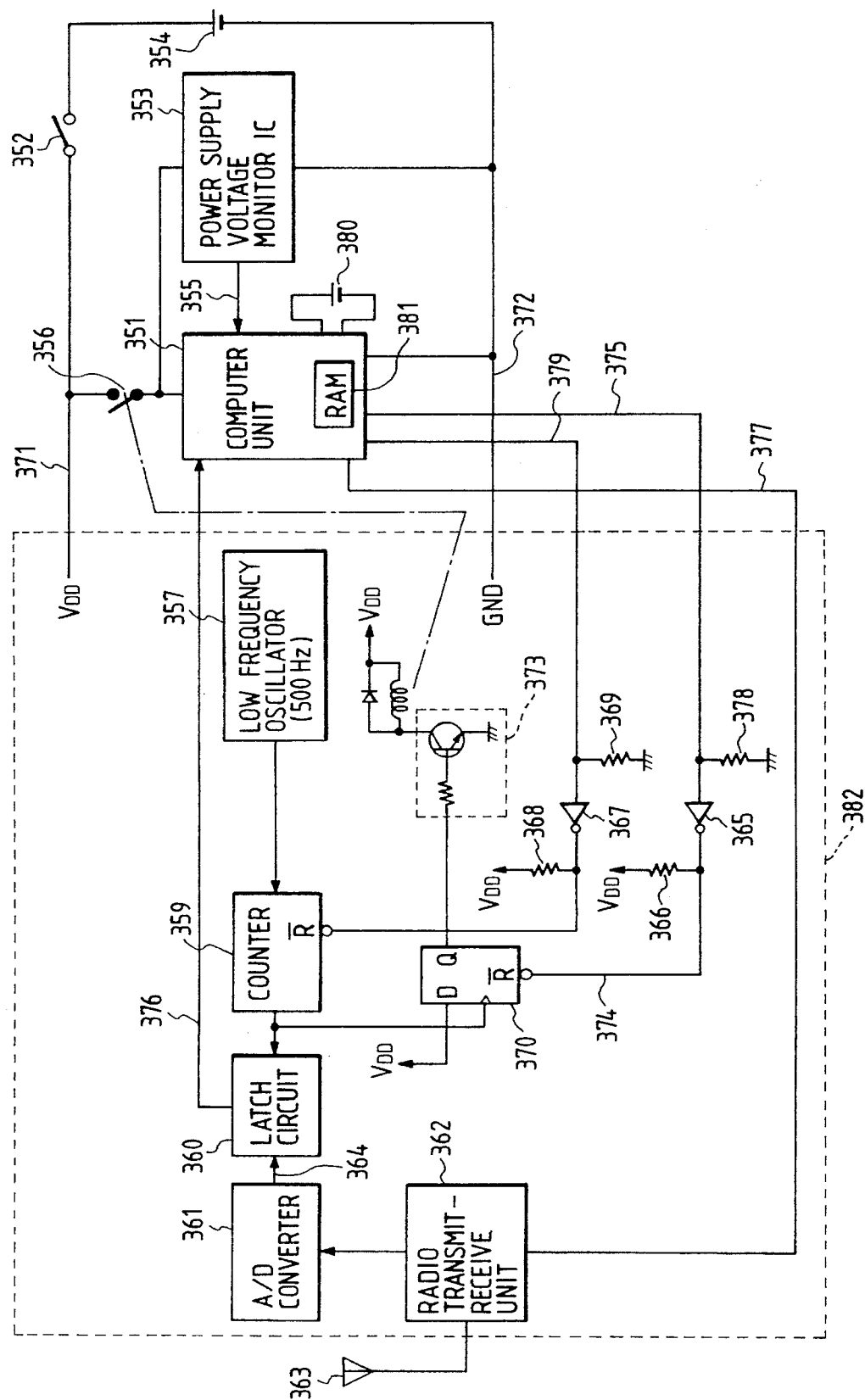
FIG. 18 is a block diagram for explaining a configuration of a portable electronic device according to another embodiment of the present invention.

FIG. 18 is a block diagram showing a configuration of a portable electronic device according to another embodiment of the present invention.

In the figure, 351 is a computer unit containing RAM 381, the contents of RAM 381 held by a backup battery 380 (consisting of lithium battery). The computer unit 351 is initiated by the clock oscillating within the computer unit 351 upon the releasing of the reset on the reset line 355.

354 is a battery for supplying a constant power supply voltage to the circuit in accordance with the on/off state of a power supply switch 352. 353 is a power supply voltage monitor IC for monitoring the voltage state to be applied to the computer unit 351 to send out a reset signal via a reset line 355 to the computer unit 351. 356 is a relay switch which is switched on/off by a relay drive circuit 373. 360 is a latch circuit for latching received electric field strength, which is detected by the radio transmit-receive unit 362 and then transmitted via an A/D converter output line 364 after A/D conversion by an A/D converter 361. 363 is an antenna, 365 is an open collector inverter which sends out a reset signal to a flip-flop 370 depending on the state of a reset control signal input via a reset control signal line 375 to which a resistor 378 having its one end grounded is connected. 374 is a reset line for outputting the reset signal output from the open collector inverter 365 to the flip-flop 370. The reset line 374 is pulled up by the resistor 366.

367 is an open collector inverter which sends out the reset signal to the counter circuit 359 depending on the state of control signal input via a reset control signal line 379 to which a resistor 369 having its one end grounded is connected. 368 is a resistor for pulling up the voltage of counter input line. 382 is a substrate the packaged chip components of which are driven by a power supply VDD from a power supply line 371. 372 is a ground line with its one end connected to a ground line GND of the substrate 382. 376 is a latch data line for transferring received electric field strength latched in the latch circuit 360 into the computer unit 351. 377 is a communication line.

Figure 19:
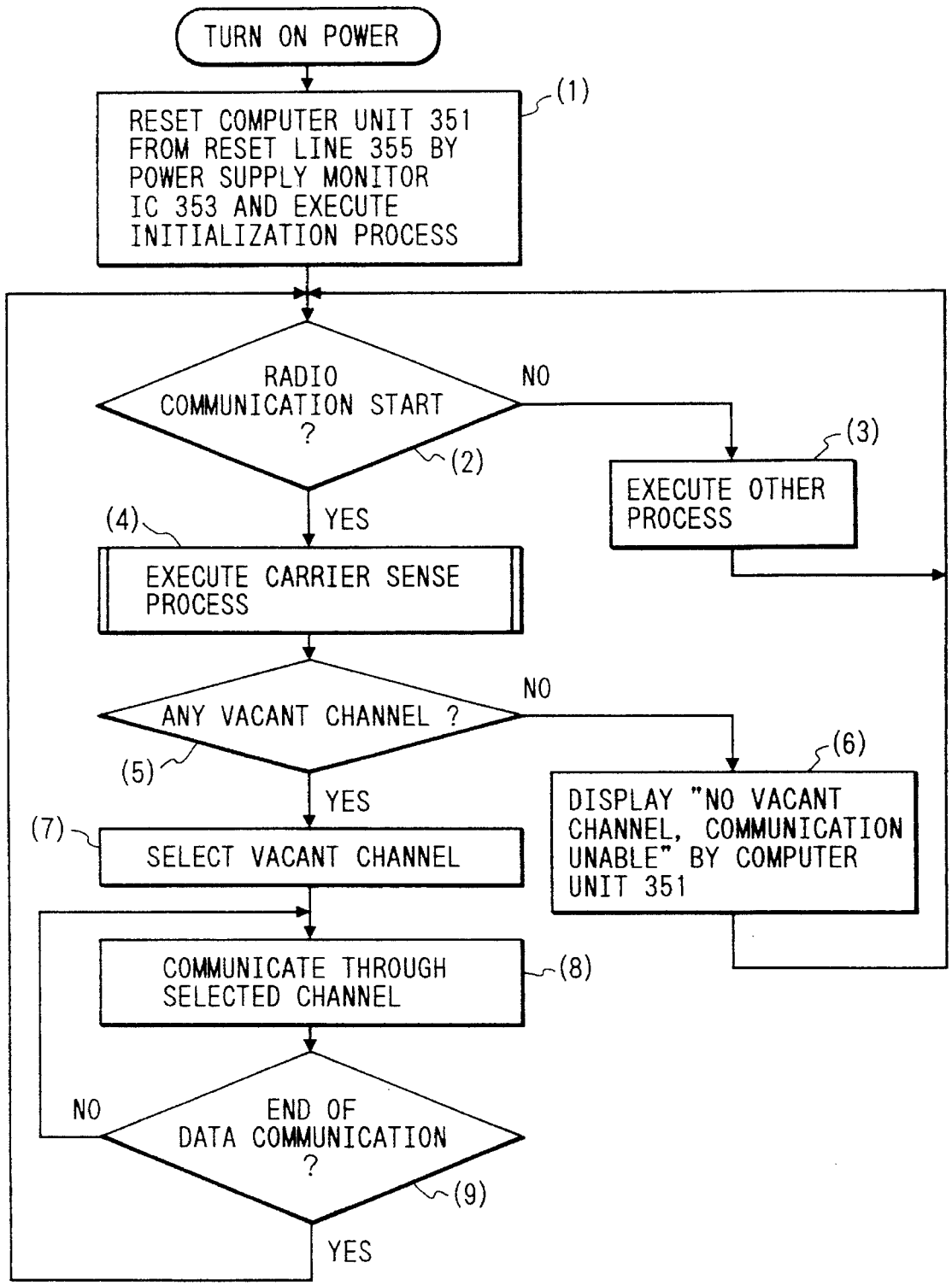
FIG. 19 is a flowchart showing one example of a second radio communication processing means in the portable electronic device according to the present invention.

FIG. 19 is a flowchart showing one example of a second radio communication processing procedure in a portable electronic device according to the present invention. Note that (1) to (9) indicate each step.

First, if power switch 352 is turned on, the reset control signal lines 379, 375 are at "LOW" in the initial state, whereby the counter 359 carries out after the elapse of e.g., 30 msec, the flip-flop 370 sets the output Q to "HIGH", the relay driving circuit 373 turns on the relay switch 356, the computer unit 351 is reset via the reset line 355 and sets the reset control signal 379 to "HIGH", and then initialization process is executed (1).

Then, the computer unit 351 is checked to determine whether to start the radio communication (2), in which if the answer is NO, the computer unit 351 executes other process (3) and the procedure returns to step (2).

On the other hand, if the determination at step (2) is YES, the radio transmit-receive unit 362 receives all the channels one by one to execute carrier sense process (the detail procedure will be described later) for retrieving the channel having a predetermined electric field strength or less (4). Then, the presence or absence of any vacant channel is determined (5), in which if the answer is NO, the computer unit 351 displays a message "NO VACANT CHANNEL COMMUNICATION UNABLE" on a display unit, not shown (6), and the procedure returns to step (2).

On the other hand, if the determination at step (5) is YES, an arbitrary vacant channel, for example, a channel having the smallest channel number among the vacant channels, is selected (7). Then, communication is performed through selected channel, that is, the computer unit 351 communicates data with the radio transmit-receive unit 362 via the communication line 377, with data exchange (8), and the end of data communication is judged (9), in which the procedure returns to step (2) if the answer is YES, or otherwise to step (8).

Figure 20:
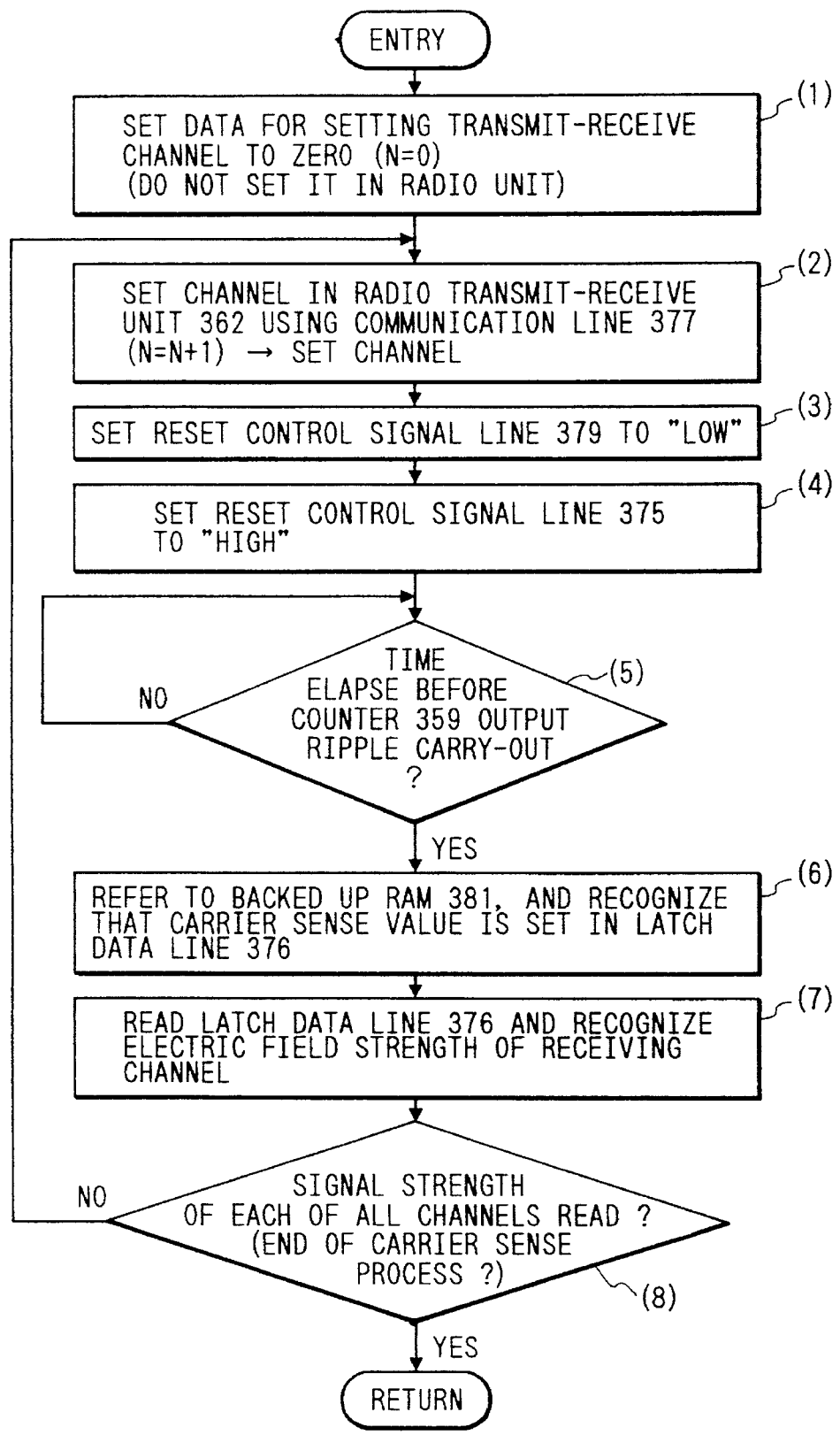
FIG. 20 is a flowchart showing in detail one example of a carrier sense processing procedure as shown in FIG. 19.

Referring now to flowchart as shown in FIG. 20, processing operation of carrier sense as shown in FIG. 19 will be described below.

FIG. 20 is a flowchart showing in detail one example of a carrier sense processing procedure as shown in FIG. 19. Note that (1) to (8) indicate each step.

First, data for setting transmit-receive channel is set to zero (1). At this step, the radio transmit-receive unit 362 has no channel setting. Then, the computer unit 351 sets channel (N=N+1) in the radio transmit-receive unit 362 (2). Then, the reset control signal line 379 is set to "LOW" (3), and subsequently the reset control signal line 375 is set to "HIGH" (4). Thereby, the flip-flop 370 is reset, the output Q is at "LOW", the relay driving circuit 373 is kept in the off state, and the power supply to the computer unit 351 is kept in the off state. Therefore, the reset control signal lines 375, 379 are kept in "LOW".

Then, the procedure waits for a predetermined time to elapse until the counter 359 outputs a ripple carry-out (5). If the counter 359 outputs a ripple carry-out after the elapse of e.g., 30 msec, the Q output of flip-flop 370 is kept in "HIGH" state, the relay driving circuit 373 is kept in "ON" state, and the power supply to the computer unit 351 is turned on. However, the reset control signal lines 375, 379 are kept in "LOW" state, owing to resistors 369, 378, because there is no output from the computer unit 351 when the power of computer unit 351 is turned on.

Then, the computer unit 351 refers to backed up RAM 381 and recognizes that a carrier sense value is set in the latch data line 376 (6). (The computer unit is turned off by the flag state of RAM 381, because of a carrier sense processing, and reset via the reset line 355, thereby recognizing the initiation.) Then, latch data latched in the latch circuit 360 is read via the latch data line 376 to recognize the electric field strength of receiving channel (7). Then, a determination is performed as to whether or not the signal strength of each of all the channels is read (N=10 (where channel number N is e.g., from 1 to 10)) (8), in which if the answer is YES, the procedure returns to main procedure, or otherwise returns to step (2) to repeat the above processing.

Figure 21:
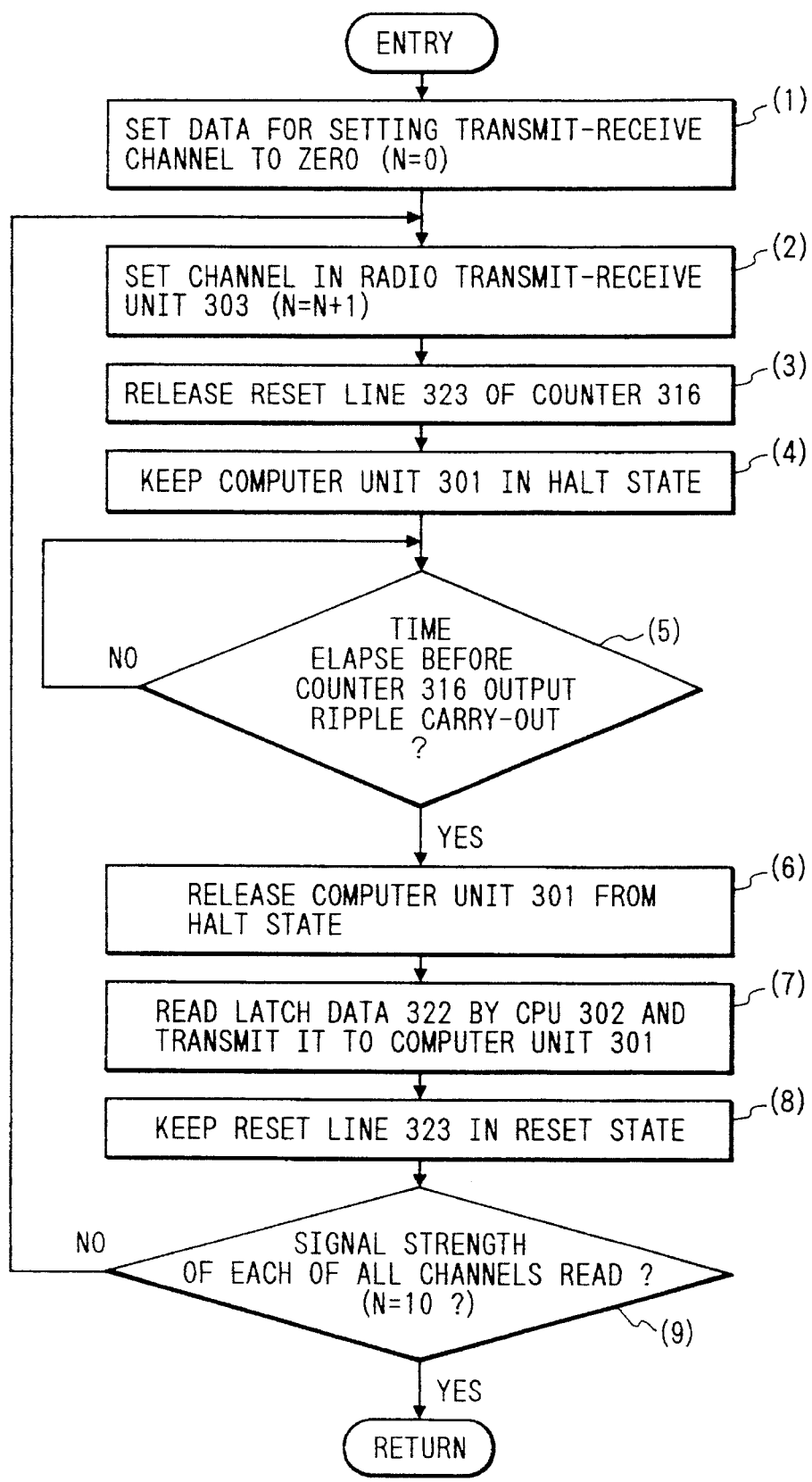
FIG. 21 is a flowchart showing in detail another example of a carrier sense processing procedure as shown in FIG. 16.

FIG. 21 is a flowchart showing another embodiment of the present invention. Note that the block diagram and the main flowchart are the same as those of embodiment shown in FIGS. 15 and 16.

Referring now to flowchart as shown in FIG. 21, processing operation of carrier sense as shown in FIG. 16 will be described below.

FIG. 21 is a flowchart showing in detail one example of a carrier sense processing procedure as shown in FIG. 16. Note that (1) to (9) indicate each step.

First, data for setting transmit-receive channel is set to zero (1). At this step, the radio transmit-receive unit 303 has no channel setting. Then, the computer unit 301 sets channel (N=N+1) in the radio transmit-receive unit 303 via the sub-CPU 302 (2). Then, the reset line 323 of counter 316 is released (3). The computer unit 301 is kept in halt state by executing a halt instruction (4). Then, waiting for a predetermined time to elapse until the counter 316 outputs a ripple carry-out 320 (5), and if the ripple carry-out 320 is output, the computer unit 301 is released from the halt state via the interrupt line 327 (6). Then, ripple carry-out signal 320 is output by a processing to be carried out during waiting time of the above step (5), that is, if the input of the counter 316 is counted (2 msec for one period) by, for example, fifteen times, and latch data latched in latch circuit 317 by a processing of latching the value of A/D converter 318 in latch circuit 317 is read by the sub-CPU 302 via the latch data output line 322, and transmitted via the control line 308 to the computer unit 301 (7).

Then, the reset line 323 is kept in reset state (8). And a determination is performed as to whether or not the signal strength of each of all the channels is read (N=10 (where channel number N is e.g., from 1 to 10)) (9), in which if the answer is YES, the procedure returns to main procedure, or otherwise returns to step (2) to repeat the above processing.

In the above embodiment, the radio transmit-receive unit 303 is prevented from experiencing influence of noise arising in the processing of the computer unit 301 by halting the computer unit 301 for a certain time until electric field strength output data of the radio transmit-receive unit 303 is held.

Figure 22:
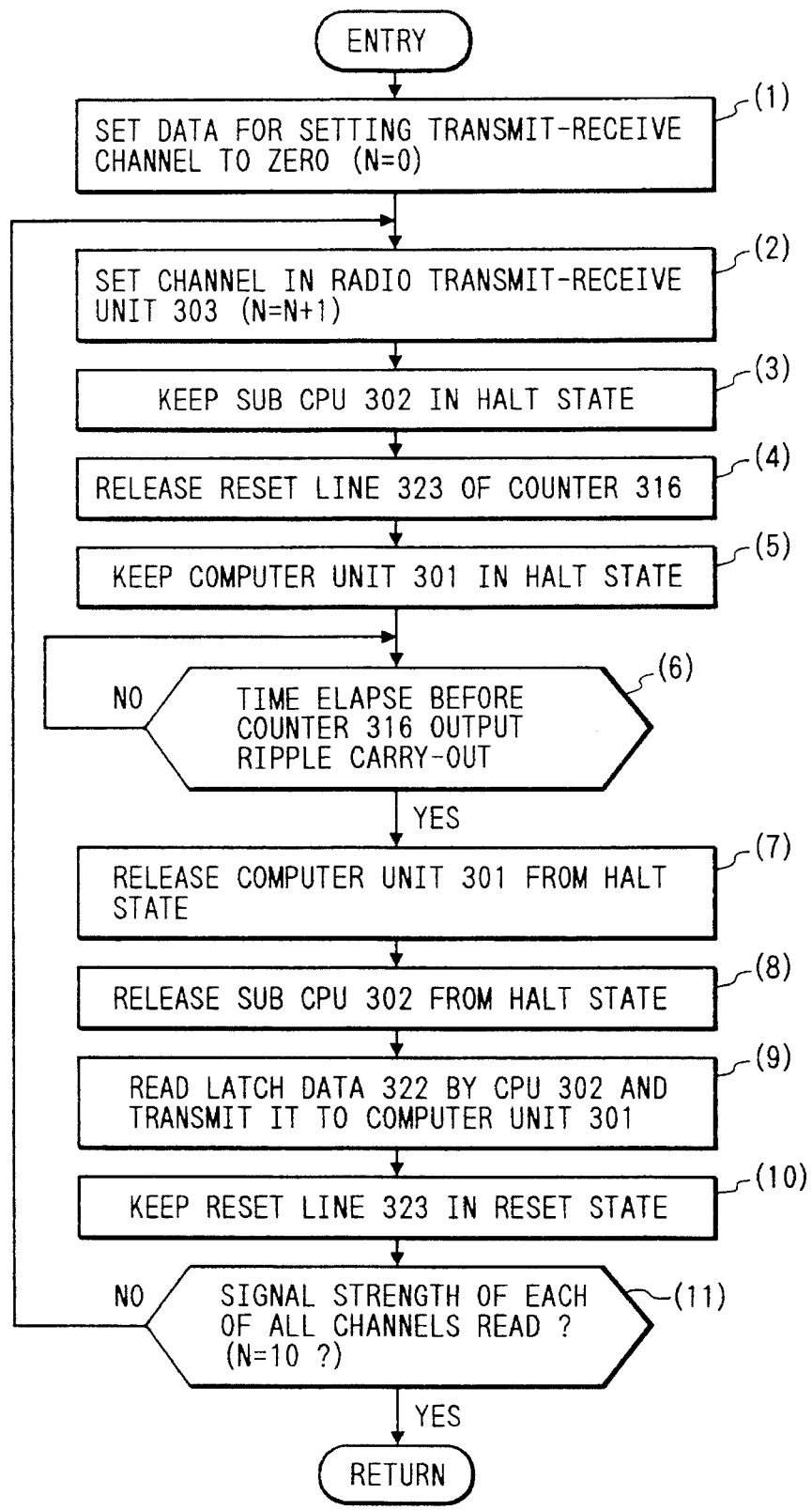
FIG. 22 is a flowchart showing in detail another example of a carrier sense processing procedure as shown in FIG. 16.

FIG. 22 is flowchart showing another embodiment of the present invention. Note that the block diagram and the main flowchart are the same as those of embodiment shown in FIGS. 15 and 16.

Referring now to flowchart as shown in FIG. 22, processing operation of carrier sense as shown in FIG. 16 will be described below.

FIG. 22 is a flowchart showing in detail one example of a carrier sense processing procedure as shown in FIG. 16. Note that (1) to (11) indicate each step.

First, data for setting transmit-receive channel is set to zero (1). At this step, the radio transmit-receive unit 303 has no channel setting. Then, the computer unit 301 sets channel (N=N+1) in the radio transmit-receive unit 303 via the sub-CPU 302 (2). Then, the computer unit 301 keeps the sub-CPU 302 in halt state (3), releases the reset line 323 of counter 316 (4), and keeps itself in halt state (5). Then, waiting for a predetermined time to elapse until the counter 316 outputs a ripple carry-out 320 (6), and if the ripple carry-out 320 is output, the computer unit 301 releases itself from the halt state via the interrupt line 327 (7). Then, the computer unit 301 releases the sub-CPU 302 from the halt state (8). Then, ripple carry-out signal 320 is output by a processing to be carried out during waiting time of the above step (6), that is, if the input of the counter 316 is counted (2 msec for one period) by, for example, fifteen times, and latch data latched in latch circuit 317 by a processing of latching the value of A/D converter 318 in latch circuit 317 is read by the sub-CPU 302 via the latch data output line 322, and transmitted via the control line 308 to the computer unit 301 (9).

Then, the reset line 323 is kept in reset state (10). And a determination is performed as to whether or not the signal strength of each of all the channels is read (N=10 (where channel number N is e.g., from 1 to 10)) (11), in which if the answer is YES, the procedure returns to main procedure, or otherwise returns to step (2) to repeat the above processing.

In the above embodiment, the radio transmit-receive unit 303 is prevented from experiencing influence of noise arising in the processing of the computer unit 301 and the sub-CPU 302 by halting the computer unit 301 and the sub-CPU 302 for a certain time until electric field strength output data of the radio transmit-receive unit 303 is held.

What is claimed is:

1. An electronic device having a radio transmit-receive unit for performing radio communication processing with an external device via an antenna, and a computer unit for processing desired information, comprising:

set control means for setting said computer unit to a rest state;

timer means for measuring a signal receive time of said radio transmit-receive unit in accordance with activation of said set control means and the computer unit in the rest state;

holding means for holding electric field strength information associated with at least one carrier received by said radio transmit-receive unit during the rest state of the computer unit; and restart control means for switching the rest state of said computer unit to an active state after a predetermined period of time measured by said timer means.

2. The electronic device according to claim 1, wherein said set control means sets the computer unit to the rest state by shutting down a power supply to said computer unit.

3. The electronic device according to claim 1, wherein said set control means sets the computer unit to the rest state by resetting said computer unit.

4. The electronic device according to claim 1, wherein said set control means sets the computer unit to the rest state by keeping said computer unit itself in halt state.

5. An electronic device having a radio transmit-receive unit for performing radio communication processing with an external device via an antenna, and a computer unit for processing desired information, comprising:

set control means for setting said computer unit to a halt state;

timer means for measuring a signal receive time of said radio transmit-receive unit in accordance with activation of said set control means and the computer unit in the halt state;

holding means for holding electric information regarding at least one carrier received by said radio transmit-receive unit in the halt state; and restart control means for switching the halt state of said computer unit to an active state after a predetermined period of time measured by said timer means.

6. An electronic device having a radio transmit-receive unit for performing radio communication processing with an external device via an antenna, and a first computer unit for processing desired information, comprising:

a second computer unit for communicating with said radio transmit-receive unit;

set control means for setting said second computer unit to a rest state;

timer means for counting a signal receive time of said radio transmit-receive unit in accordance with activation of said set control means and the second computer in the rest state;

holding means for holding receivable channel information of at least one carrier received by said radio transmit-receive unit in the rest state; and restart control means for switching the rest state of said second computer unit to an active state after counting up to a desired count by said timer means to set said receivable channel information held in said holding means by said second computer unit to said first computer unit.

7. The electronic device according to claim 6, wherein said set control means sets the second computer unit to the rest state by shutting down a power supply to said second computer unit.

8. The electronic device according to claim 6, wherein said set control means sets the second computer unit to the rest state by resetting said second computer unit.

9. The electronic device according to claim 6, wherein said set control means sets the second computer unit to the rest state by keeping said second computer unit itself in a halt state.

10. An electronic device having a radio transmit-receive unit for performing radio communication processing with an external device via an antenna, and a first computer unit for processing desired information, comprising:

a second computer unit for communicating with said radio transmit-receive unit;

set control means for setting said first computer unit and said second computer unit to a rest state;

timer means for counting a signal receive time of said radio transmit-receive unit in accordance with activation of said set control means and the first and second computer units in the rest state;

holding means for holding receivable channel information of at least one carrier received by said radio transmit-receive unit in the rest state; and restart control means for switching the rest state of said first computer unit and said second computer unit to an active state after counting up to a desired count by said timer means to set said receivable channel information held in said holding means by said second computer unit to said first computer unit.

11. The electronic device according to claim 10, wherein said set control means sets the first computer unit and the second computer unit to the rest state by shutting down a power supply to said first computer unit and said second computer unit.

12. The electronic device according to claim 10, wherein said set control means sets the first computer unit and the second computer unit to the rest state by resetting said first computer unit and said second computer unit.

13. The electronic device according to claim 10, wherein said set control means sets the first computer unit and the second computer unit to the rest state by keeping said first computer unit and said second computer unit themselves in a halt state.

* * * * *

UNITED STATES PATENT AND TRADEMARK OFFICE
CERTIFICATE OF CORRECTION

PATENT NO. : 5,604,928
DATED : February 18, 1997
INVENTOR(S) : SOJI HAMANO, ET AL., It is certified that error appears in the above-indentified patent and that said Letters Patent is hereby corrected as shown below:

COLUMN 1

Line 31, "as great" should read --at as great a--.
Line 63, "unto" should read --into--.

COLUMN 2

Line 48, "to-set" should read --to set--.

COLUMN 3

Line 41, "another-embodi-" should read --another embodi- --.

COLUMN 4

Line 54, "to 2 msec" should read --to e.g., 2 msec--.

COLUMN 5

Line 56, "to-start" should read --to start--.

COLUMN 7

Line 12, "out-put" should read --output--.

UNITED STATES PATENT AND TRADEMARK OFFICE
CERTIFICATE OF CORRECTION

PATENT NO. : 5,604,928

DATED : February 18, 1997

INVENTOR(S) : SOJI HAMANO, ET AL.,

It is certified that error appears in the above-indentified patent and that said Letters Patent is hereby corrected as shown below:

COLUMN 12

Line 54, "(the" should read --(The--.

COLUMN 15

Line 11, "(With" should read --(with--.

Signed and Sealed this

Twenty-sixth Day of August, 1997

*Attest:*

BRUCE LEHMAN

*Attesting Officer*     *Commissioner of Patents and Trademarks*